United States Patent
Venkataraman et al.

(10) Patent No.: US 12,267,800 B2
(45) Date of Patent: *Apr. 1, 2025

(54) NETWORK (NW) TECHNIQUES FOR CONSTRAINTS ON SIMULTANEOUS USE OF NETWORK SLICES

(71) Applicant: Apple Inc., Cupertino, CA (US)

(72) Inventors: Vijay Venkataraman, Cupertino, CA (US); Alosious Pradeep Prabhakar, Singapore (SG); Krisztian Kiss, Cupertino, CA (US); Nirlesh Koshta, Bengaluru (IN); Rohit R Matolia, Bengaluru (IN); Sridhar Prakasam, Cupertino, CA (US); Srinivasan Nimmala, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/441,483

(22) PCT Filed: Aug. 12, 2021

(86) PCT No.: PCT/US2021/045722
§ 371 (c)(1),
(2) Date: Sep. 21, 2021

(87) PCT Pub. No.: WO2022/036081
PCT Pub. Date: Feb. 17, 2022

(65) Prior Publication Data
US 2023/0180169 A1      Jun. 8, 2023

(30) Foreign Application Priority Data
Aug. 13, 2020   (IN) .............. 202041034805

(51) Int. Cl.
*H04W 60/00* (2009.01)
*H04W 48/18* (2009.01)
*H04W 76/10* (2018.01)

(52) U.S. Cl.
CPC ......... *H04W 60/005* (2013.01); *H04W 48/18* (2013.01); *H04W 76/10* (2018.02)

(58) Field of Classification Search
CPC ... H04W 60/005; H04W 48/18; H04W 76/10; H04W 8/18; H04W 76/30
See application file for complete search history.

(56) References Cited

U.S. PATENT DOCUMENTS

| 2021/0144790 | A1 | 5/2021 | Faccin |
| 2022/0141763 | A1* | 5/2022 | Casati .................. H04W 60/04 455/435.1 |

(Continued)

FOREIGN PATENT DOCUMENTS

| CN | 109474967 A | * | 3/2019 | ............ H04W 16/10 |

OTHER PUBLICATIONS

3GPP TR 23.700-40 V0.4.0 (Jun. 2020) 3rd Generation Partnership Project; Technical Specification Group Services and System Aspects: a Study on enhancement of network slicing; Phase 2 (Release 17) (Year: 2020).*

(Continued)

*Primary Examiner* — Lester G Kincaid
*Assistant Examiner* — Dung L Lam
(74) *Attorney, Agent, or Firm* — Eschweiler & Potashnik, LLC; Matthew W Glause

(57) ABSTRACT

Techniques discussed herein facilitate configuration of network slices for a User Equipment (UE) supporting constraints on simultaneous operation of slices. Such a technique may comprise: receiving a registration request message to request registration on a set of requested network slices;

(Continued)

registering the UE to a set of allowed network slices; and generating a registration accept message for transmission indicating the UE is registered to the set of allowed network slices, wherein the registration accept message indicates slice compatibility information for each allowed network slice of the set of allowed network slices for the UE, wherein the slice compatibility information for each allowed network slice indicates whether or not other configured network slices of a set of configured network slices are compatible with the configured network slice for simultaneous operation by the UE.

9 Claims, 19 Drawing Sheets

(56) References Cited

U.S. PATENT DOCUMENTS

| | | | | |
|---|---|---|---|---|
| 2022/0256451 | A1* | 8/2022 | Ianev | H04L 65/1073 |
| 2022/0369401 | A1 | 11/2022 | Won | |
| 2023/0052699 | A1* | 2/2023 | Ninglekhu | H04W 60/04 |

OTHER PUBLICATIONS

3rd Generation Partnership Project; Technical Specification Group Services and System Aspects; Procedures for the 5G System (5GS); Stage 2 (Release 16); 3GPP TS 23.502 V16.5.1 (Aug. 2020); http://www.3gpp.org.

International Search Report Dated Dec. 20, 2021 for International Application PCT/US2021/045651.

International Written Opinion Dated Dec. 20, 2021 for International Application PCT/US2021/045651.

NEC; KI#6 new Sol#X; Network slices simultaneous usage incompatibility support; 3GPP TSG-SA WG2 Meeting #139E; S2-2004582; Jun. 1, 2020.

Nokia; KI#6 New solution on simultaneous use of the network slice; SA WG2 Meeting #139e; S2-2004583; Jun. 1, 2020.

Apple; KI#6 New Sol; UE handling of constraints on simultaneous use of network slices based on network assistance; SA WG2 Meeting #140E; S2-2005804; Aug. 19, 2020.

3rd Generation Partnership Project; technical Specification Group Services and System Aspects; Study on enhancement of network slicing; Phase 2 (Release17); 3GPP TR 23.700-40 V0.4.0; Jun. 2020.

3rd Generation Partnership Project; technical Specification Group Services and System Aspects; Study on enhancement of network slicing; Phase 2 (Release17); 3GPP TR 23.700-40 V0.4.0; Jun. 2020; pp. 85-143.

International Search Report Dated Dec. 20, 2021 for International Application PCT/US2021/045722.

International Written Opinion Dated Dec. 20, 2021 for International Application PCT/US2021/045722.

U.S. Appl. No. 17/441,457, filed with the USPTO on Sep. 21, 2021.

GSM Association; "Official Document NG. 116—Generic Network Slice Template"; Version 2.0; Oct. 16, 2019; p. 1-61.

Non-Final Office Action dated Oct. 26, 2023 in connection with U.S. Appl. No. 17/441,457.

International Preliminary Report on Patentability dated Feb. 7, 2023 in connection with Application Serial No. PCT/US2021/045722.

International Preliminary Report on Patentability dated Feb. 7, 2023 in connection with Application Serial No. PCT/US2021/045651.

Final Office Action dated Apr. 9, 2024, for U.S. Appl. No. 17/441,457.

Notice of Allowance dated Jul. 8, 2024, for U.S. Appl. No. 17/441,457.

Related US Application filed on Aug. 12, 2024 in connection with U.S. Appl. No. 18/800,651.

* cited by examiner

|  | SST | SD (optional) | Compatible Slice | Interpretation |
|---|---|---|---|---|
| Slice 1 | eMBB | 1 | Slice 2,3 | Slices 1, 2 & 3 are compatible |
| Slice 2 | eMBB | 2 | Slice 1 | Slices 1 and 2 are compatible |
| Slice 3 | V2X | 3 | Slice 1 | Slices 1 and 3 are compatible |

S-NSSAI:=SST(8bits) || SD(24bits)

*FIG. 9*

|  | SST | SD (optional) | InCompatible Slice | Served by same AMF | Interpretation (overlapping rules in rows - the rule appearing higher up in the table will be given precedence) |
|---|---|---|---|---|---|
| Slice 1 | eMBB(1) | 1 | Slice 3 | No | Slices 1 and 3 are served by different AMFs |
| Slice 2 | eMBB(1) | 2 | Slice 3 | No | Slices 2 and 3 are served by different AMFs |
| Slice 3 | V2X(4) | 3 | Slice 1 | No | (Not necessary, previous two entries imply it) Slices 1 and 3 are served by different AMFs |
| Slice 4 | URLLC(2) | 4 | Slice 1 | Yes | Slices 1 and 4 are served by same AMF (but presence of this entry in this IE indicates PDU sessions for slices 1 and 4 cannot be active simultaneously |

S-NSSAI=SST(8bits) || SD(24bits)

|  | SST | SD |
|---|---|---|
| Slice 1 | 1 | 1 |
| Slice 2 | 1 | 2 |
| Slice 3 | 4 | 3 |
| Slice 4 | 2 | 4 |
| Slice 5 | 4 | 1 |
| Slice 6 | 5 | 0 |

| Slice Type | SST |
|---|---|
| eMBB | 1 |
| URLLC | 2 |
| MIOT | 3 |
| V2X | 4 |
| Non_standard (served by only camped PLMN) | 5 |

*FIG. 10*

|   | SST | InCompatible SST | Served by same AMF | Interpretation (overlapping rules in rows - the rule appearing higher up in the table will be given precedence) |
|---|---|---|---|---|
| 1 | eMBB(1) | V2X(4) | No | Slices 1 and 4 are served by different AMFs. |
| 2 | eMBB(1) | URLLC(2) | No | Slices 2 and 3 are served by different AMFs. AMF Re-allocation is needed for activating either of the slices belonging to these SSTs |
| 3 | eMBB(1) | Non_standard(5) | Yes | eMBB and non_standard slice can operate within same AMF but simultaneous activation of PDU sessions for slice 1 and 5 is not allowed |

S-NSSAI=SST(8bits) || SD(24bits)

|   | SST | SD |
|---|---|---|
| Slice 1 | 1 | 1 |
| Slice 2 | 1 | 2 |
| Slice 3 | 4 | 3 |
| Slice 4 | 2 | 4 |
| Slice 5 | 4 | 1 |
| Slice 6 | 5 | 0 |

| Slice Type | SST |
|---|---|
| eMBB | 1 |
| URLLC | 2 |
| MIOT | 3 |
| V2X | 4 |
| Non_standard (served by only camped PLMN) | 5 |

*FIG. 11*

| | SST | SD (optional) | InCompatible Slice constraint as per GSMA | Exclusion Type | Interpretation (overlapping rules in rows - the rule appearing higher up in the table will be given precedence) |
|---|---|---|---|---|---|
| Slice 1 | eMBB(1) | 1 | 1 | 1 | Slices having same SST as eMBB are operating in same AMF and activation of any slice having different SST will not have simultaneous PDU session activated. |
| Slice 2 | eMBB(1) | 2 | 2 | 1 | Slices having same SD as 2 are operating in same AMF but activation of a slice that does not have SD=2 when SD=2 slice is already have an active PDU session will result in SD=2 PDU session release |
| Slice 3 | V2X(4) | 3 | 1 | 2 | Slices having same SST as V2X are operating in a separate AMF. When UE requests for slice activation with SST as V2X, then network will need to do AMF re-allocation |
| Slice 5 | V2X(4) | 1 | 3 | 2 | Slice 5 is operating in a separate AMF. When UE requests for slice 5 activation, then network will need to do AMF re-allocation |

| Exclusion Type | Interpretation |
|---|---|
| 0 | No restrictions on the group of slices. These can operate simultaneously. (Just added for completeness (not necessary)) |
| 1 | Identified group of slices are served by same AMF but any other slice which does not fall into this group can not have simultaneous active PDU sessions with this slice |
| 2 | Identified group of slices is served by different AMF so activation of any slice NOT in this group when slice belonging to this group is active will need AMF re-allocation |

*FIG. 12*

NETWORK (NW) TECHNIQUES FOR CONSTRAINTS ON SIMULTANEOUS USE OF NETWORK SLICES

PRIORITY CLAIM

The present application is a National Phase entry application of International Patent Application No. PCT/US2021/045722 filed Aug. 12, 2021, which claims priority to Indian Patent Application Number 202041034805 filed Aug. 13, 2020, which is incorporated herein by reference.

BACKGROUND

Mobile communication in the next generation wireless communication system, 5G, or new radio (NR) network can provide ubiquitous connectivity and access to information, as well as ability to share data, around the globe. 5G networks and network slicing can provide a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR can comprise both further developments based on third generation partnership project (3GPP) long term evolution (LTE)-Advanced technology and additional enhanced radio access technologies (RATs) to enable seamless and faster wireless connectivity solutions.

BRIEF DESCRIPTION OF THE DRAWINGS

FIG. 9 illustrates an example table showing an example of three allowed slices, indicating Slice/Service Type (SST) values, optional SD values, and compatibility between slices, according to various aspects discussed herein.

FIG. 10 illustrates example tables showing compatibility between slices based on explicit indication of slice incompatibility, according to the third set aspects discussed herein.

FIG. 11 illustrates example tables showing compatibility between slices via indication of slice incompatibility based on SST, according to the third set aspects discussed herein.

FIG. 12 illustrates example tables showing compatibility between slices via indication of slice incompatibility based on GSMA-identified constraints, according to the third set aspects discussed herein.

DETAILED DESCRIPTION

Figure 1:
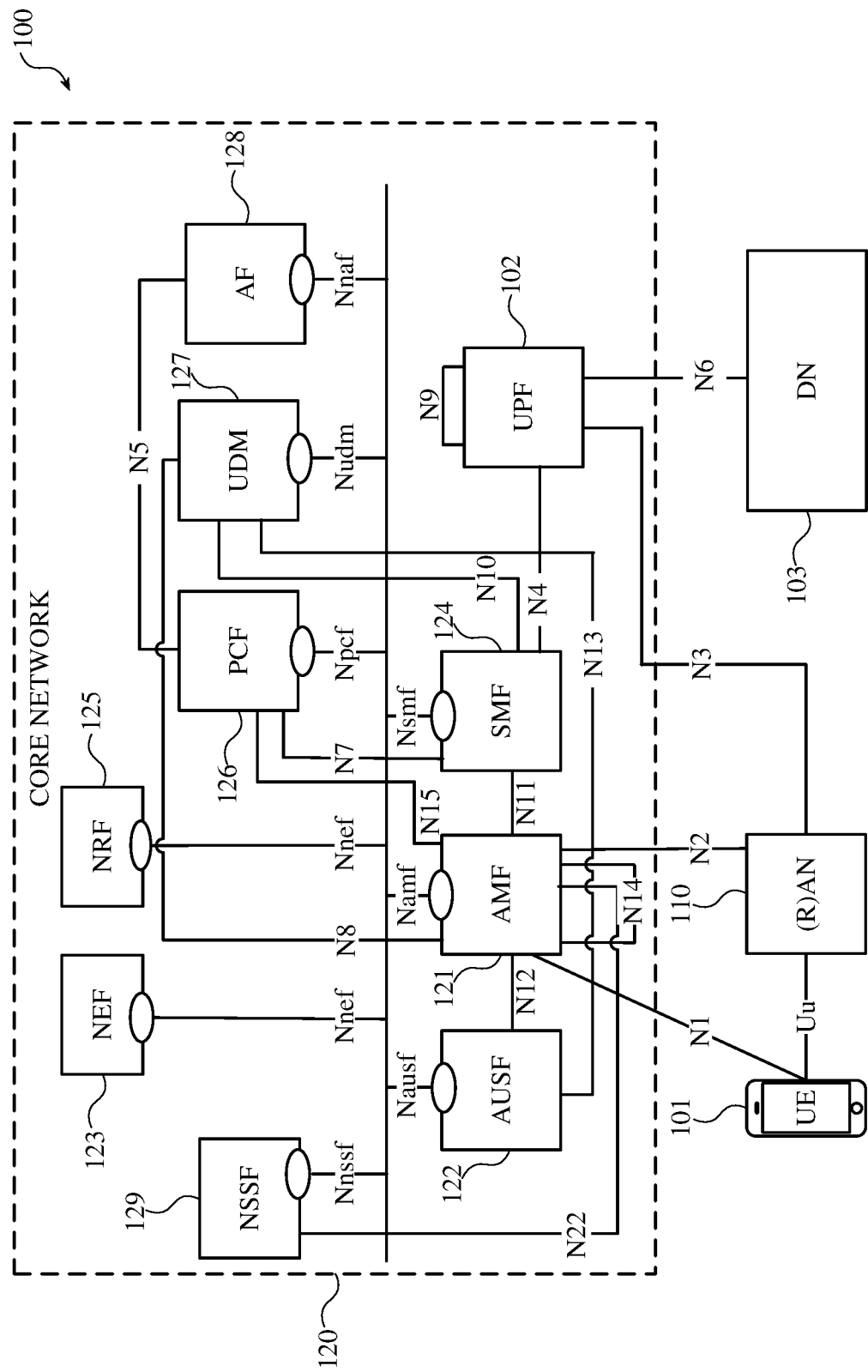
FIG. 1 is a block diagram illustrating an architecture of a system including a Core Network (CN), for example a Fifth Generation (5G) CN (5GC), in accordance with various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.). A "subset" of a set S is a "set" that can be either the set S or a "proper subset," wherein each element of the proper subset is an element of the set S, but the set S comprises at least one element that is not an element of the proper subset of set S.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects described herein can be implemented into a system using any suitably configured hardware and/or software. FIG. 1 illustrates an architecture of a system 100 including a Core Network (CN) 120, for example a Fifth Generation (5G) CN (5GC), in accordance with various aspects. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R) AN 110, which can include one or more RAN nodes (e.g., Evolved Node B(s) (eNB(s)), next generation Node B(s) (gNB(s), and/or other nodes) or other nodes or access points; and a Data Network (DN) 103, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129, which can be connected by various interfaces and/or reference points, for example, as shown in FIG. 1.

Figure 2:
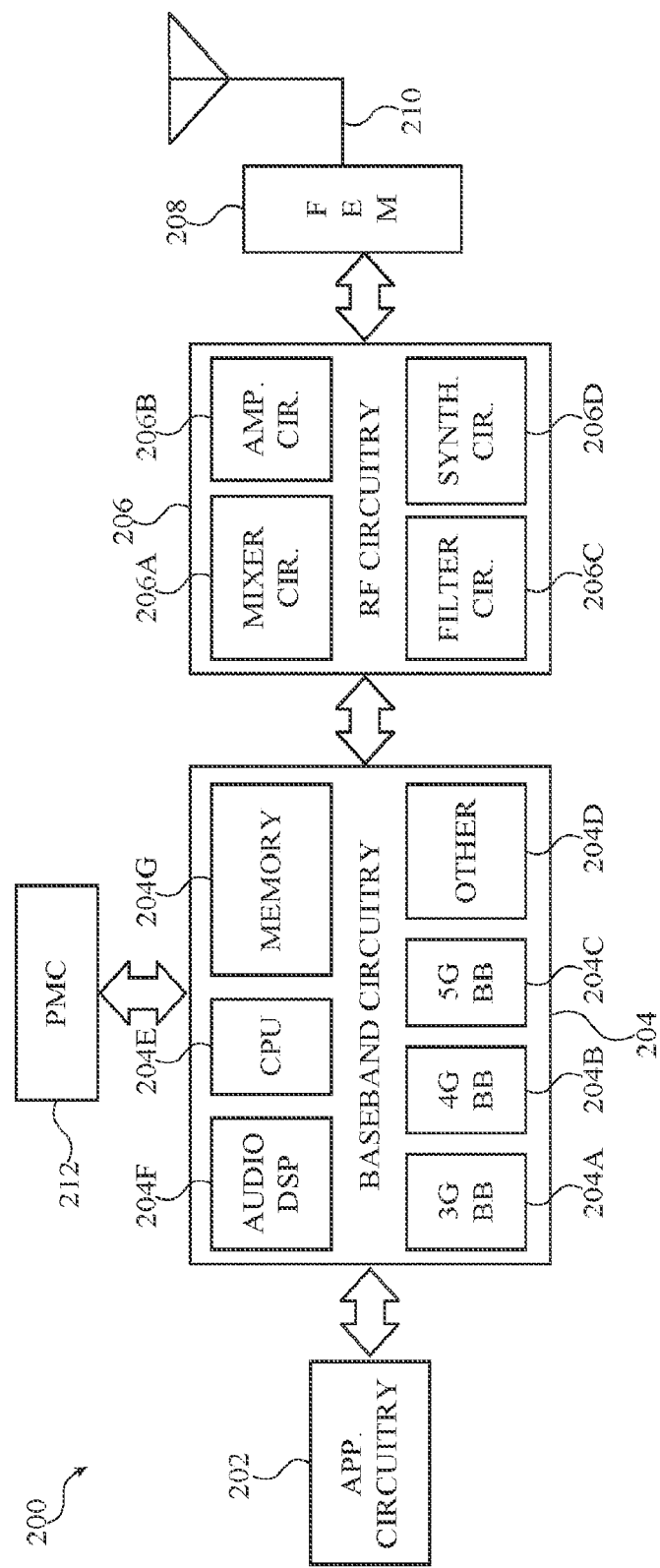
FIG. 2 is a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node may not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuity 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206*d* can be a fractional N/N+1 synthesizer.

In some aspects, frequency input can be provided by a voltage controlled oscillator (VCO), although that is not a requirement. Divider control input can be provided by either the baseband circuitry 204 or the applications circuitry 202 depending on the desired output frequency. In some aspects, a divider control input (e.g., N) can be determined from a look-up table based on a channel indicated by the applications circuitry 202.

Synthesizer circuitry 206*d* of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206*d* can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 202 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
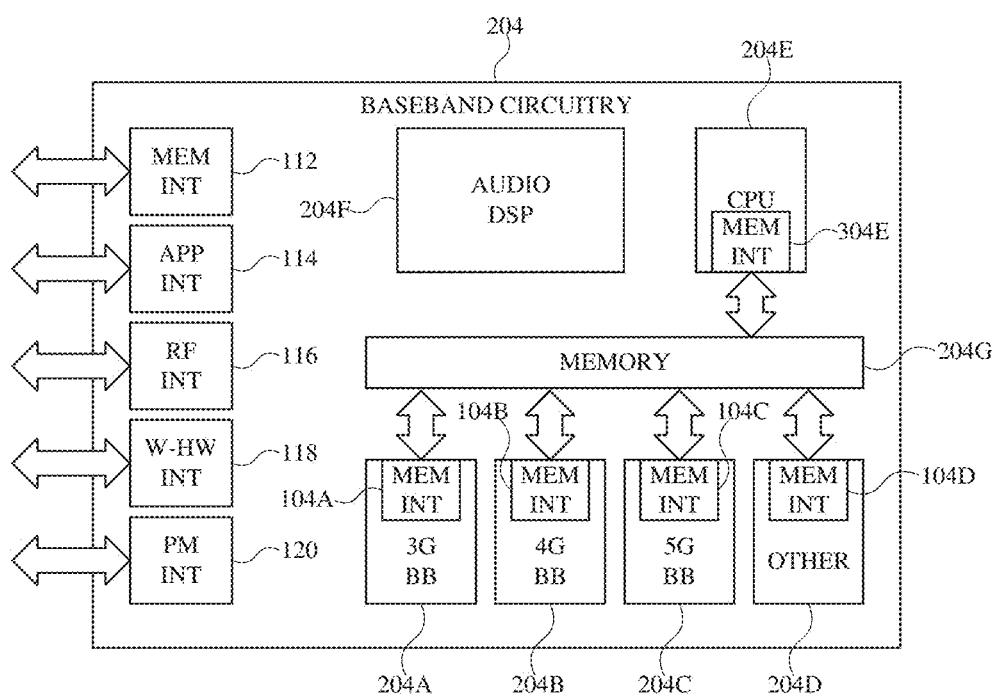
FIG. 3 is a diagram illustrating example interfaces of baseband circuitry that can be employed in accordance with various aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

In the Third Generation Partnership Project (3GPP) and herein, a network slice (also referred to herein as a slice) can be referred to by a Single Network Slice Selection Assistance Information (S-NSSAI) value which can be uniquely associated with that network slice. A set of S-NSSAI(s) can be referred to collectively as NSSAI. Configured NSSAI (also referred to herein as configured network slice(s) or configured slice(s), etc.) comprise NSSAI which are provisioned for a UE, which can be based on factors such as the UE's subscription, the current serving network, etc. Requested NSSAI (also referred to herein as requested network slice(s) or requested slice(s), etc.) comprise the NSSAI provided by the UE to a serving Public Land Mobile Network (PLMN) during registration (requested NSSAI are a subset of the configured NSSAI for the UE). Allowed NSSAI (also referred to herein as allowed network slice(s), allowed slice(s), registered NSSAI, registered network slice(s), or registered slice(s), etc.) comprise the NSSAI provided by the serving PLMN during, for example, a Registration procedure, indicating the S-NSSAI(s) value(s) the UE can use in the serving PLMN for a current Registration Area (allowed NSSAI are a subset of the requested NSSAI for the UE). Rejected NSSAI (also referred to herein as rejected network slice(s) or rejected slice(s), etc.) comprise NSSAI which are permanently or temporarily rejected for the current Registration Area or for the entire PLMN.

Embodiments relate to network slice configuration for a UE subject to constraints on simultaneous usage of network slices. Various aspects are discussed herein related to registration of network slices, establishment and release of PDU sessions on network slices, and/or activation and release of user plane resources for PDU sessions on network slices, each of which can potentially be subject to constraints on the simultaneous usage of those network slices. Constraints on network slice usage discussed herein can vary, and can comprise one or more of: (a) incompatibility of network slices to be simultaneously registered for a UE; (b) incompatibility of network slices to have simultaneously established PDU sessions for a UE; (c) incompatibility of network slices to have simultaneously active user plane resources for established PDU sessions of the UE, etc. A pair of network slices can be incompatible for simultaneous operation (to at least some extent) if one or more of constraints (a), (b), or (c) applies to that pair (e.g., if they are incompatible of being simultaneously registered, incompatible of having simultaneous established PDU sessions, and/or incompatible of having simultaneously active user plane resources for established PDU sessions, etc.).

Figure 4:
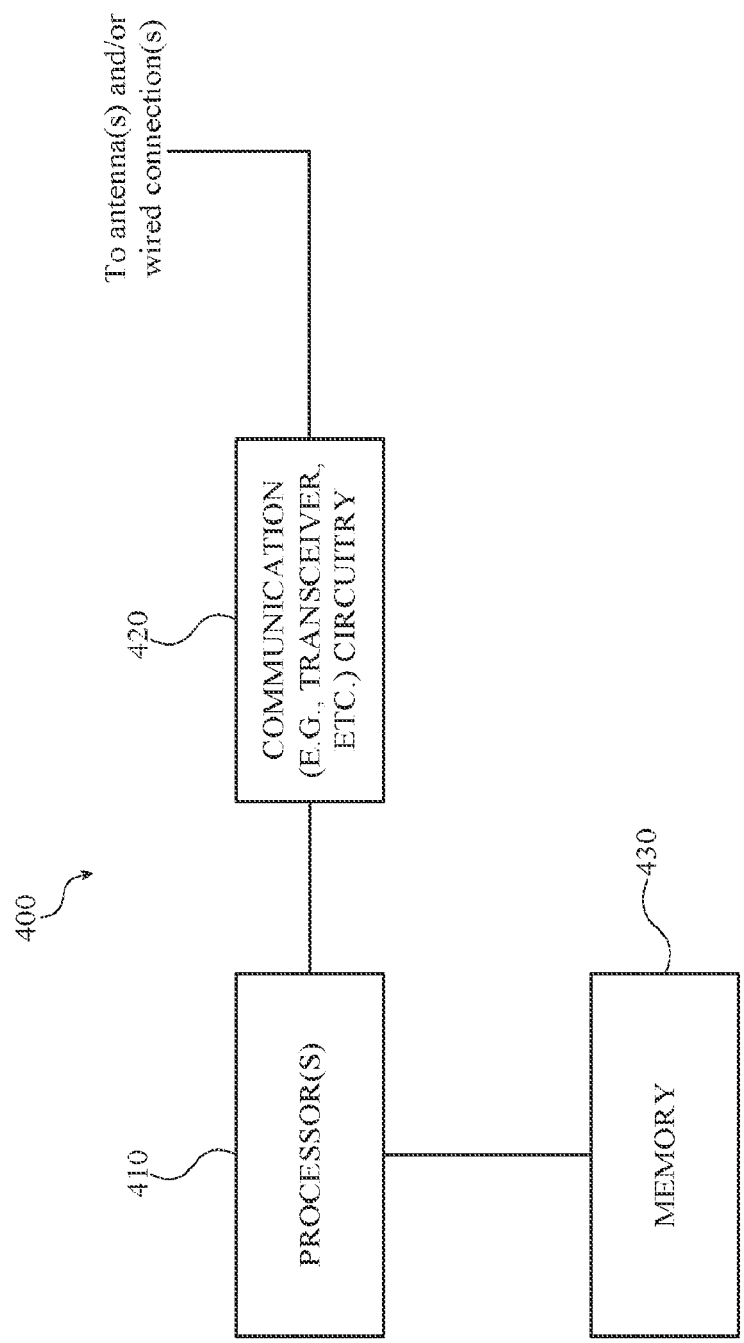
FIG. 4 is a block diagram illustrating a system that facilitates configuration related to network slices for a User Equipment (UE) subject to constraints on simultaneous usage of slices, according to various aspects discussed herein.

Referring to FIG. 4, illustrated is a block diagram of a system 400 employable at a UE (User Equipment), a Base Station (BS, such as a next generation Node B (gNodeB or gNB), evolved Node B (eNB), or other BS (base station)/ TRP (Transmit/Receive Point)), an Access and Mobility Management Function (AMF) or another component of a 3GPP (Third Generation Partnership Project) network (e.g., a 5GC (Fifth Generation Core Network)) component or function such as a UPF (User Plane Function)) that facilitates configuration related to network slices for a UE subject to constraints on simultaneous usage of slices, according to various aspects discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/ constructions, etc.), and can store instructions and/or data associated with one or more of processor(s) 410 or communication transceiver circuitry 420).

Specific types of aspects of system 400 (e.g., UE aspects, etc.) can be indicated via subscripts (e.g., system 400$_{UE}$ comprising processor(s) 410$_{UE}$, communication circuitry 420$_{UE}$, and memory 430$_{UE}$). In some aspects, such as BS aspects (e.g., system 400$_{BS}$) and network component (e.g., AMF, etc.) aspects (e.g., system 400$_{AMF}$), processor(s) (e.g., 410$_{BS}$, etc.), communication circuitry (e.g., 420$_{BS}$, etc.), and memory (e.g., 430$_{BS}$, etc.) can be in a single device or can be included in different devices, such as part of a distributed architecture. In aspects, signaling or messaging between different aspects of system 400 (e.g., 400$_1$ and 400$_2$) can be generated by processor(s) 410$_1$, transmitted by communication circuitry 420$_1$ over a suitable interface or reference point (e.g., a 3GPP air interface, N1, N8, N11, N22, etc.), received by communication circuitry 420$_2$, and processed by processor(s) 410$_2$. Depending on the type of interface, additional components (e.g., antenna(s), network port(s), etc. associated with system(s) 400$_1$ and 400$_2$) can be involved in this communication.

In various aspects, one or more of information (e.g., system information, resources associated with signaling, etc.), features, parameters, etc. can be configured to a UE via signaling (e.g., Access Stratum (AS) signaling, Non-Access Stratum (NAS)) originating from or routed through a Base Station (e.g., gNB, etc.) or other access point (e.g., via signaling generated by processor(s) 410$_{BS}$, transmitted by communication circuitry 420$_{BS}$, received by communication circuitry 420$_{UE}$, and processed by processor(s) 410$_{UE}$). Depending on the type of information, features, parameters, etc., the type of signaling employed and/or the exact details of the operations performed at the UE and/or BS in processing (e.g., signaling structure, handling of PDU(s)/ SDU(s), etc.) can vary. However, for convenience, such operations can be referred to herein as configuring information/feature(s)/parameter(s)/etc. to a UE, generating or processing configuration signaling, or via similar terminology.

Figure 5:
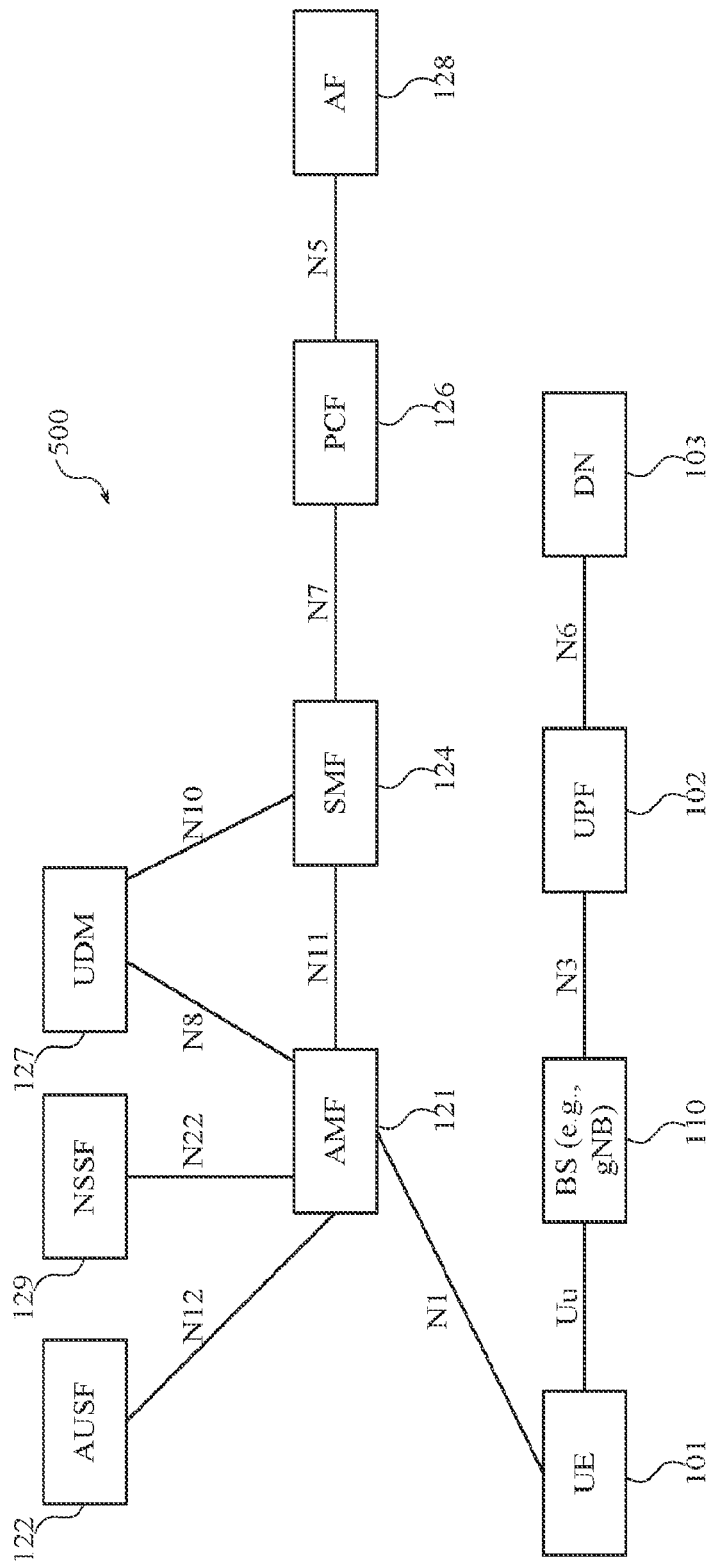
FIG. 5 is a diagram illustrating an example of a network slice in connection with various aspects discussed herein.

Referring to FIG. 5, illustrated is a diagram illustrating an example of a network slice 500 in connection with various aspects discussed herein. Each network slice (e.g., slice 500) is an independent end-to-end 5G network (which can be logical or physical). Each network slice spans across all network functions, and is isolated from other slice. Several of the components and functions illustrated in FIG. 5 have specific behavior related to network slice configuration. UDM 127 can store a subscription for a user (e.g., of UE 101), for example, whether the user has purchased a subscription to an HD streaming slice. NSSF 129 can provide logical functionality to evaluate whether a user is allowed to use a given slice in a current PLMN. PCF 126 can provide rules to the UE to identify which traffic to send via which slice. AMF 121 can act as a single point of contact to the UE for all slice related configurations. UE 101 can setup slice specific sessions, and route packets on the appropriate slice(s).

The independence of network slices allows for the potential for customization of RAN (Radio Access Network) and/or CN (Core Network) configuration per network slice. From the AS (Access Stratum) perspective, slice traffic is part of a separate DRB (Data Radio Bearer). From the NAS (Non-Access Stratum) perspective, slice traffic is part of separate PDU (Protocol Data Unit) session.

The types of entities that can be involved in managing, leasing or developing a slice can vary. A slice is owned by a network operator, but can be subleased to an enterprise (e.g., Apple), which can develop use cases to leverage slice benefits. Each slice has its own Service Level Agreement (SLA), which can specify characteristics of it, such as the maximum number of users simultaneously active, the aggregated bandwidth, etc.

There are multiple potential business use cases for network slices. As examples, network slices can provide: (1) QoS (Quality of Service) management per service (e.g., uRLLC, eMBB, Vehicle to Everything (V2X), etc.); (2) Higher security enforcement (e.g., secured apps, enterprise solutions such as corporate emails, etc.); (3) Differentiated billing (e.g., Apple owns slice for FaceTime, and can offer FaceTime services with zero data charges, and higher QoS, etc.), etc.

Figure 6:
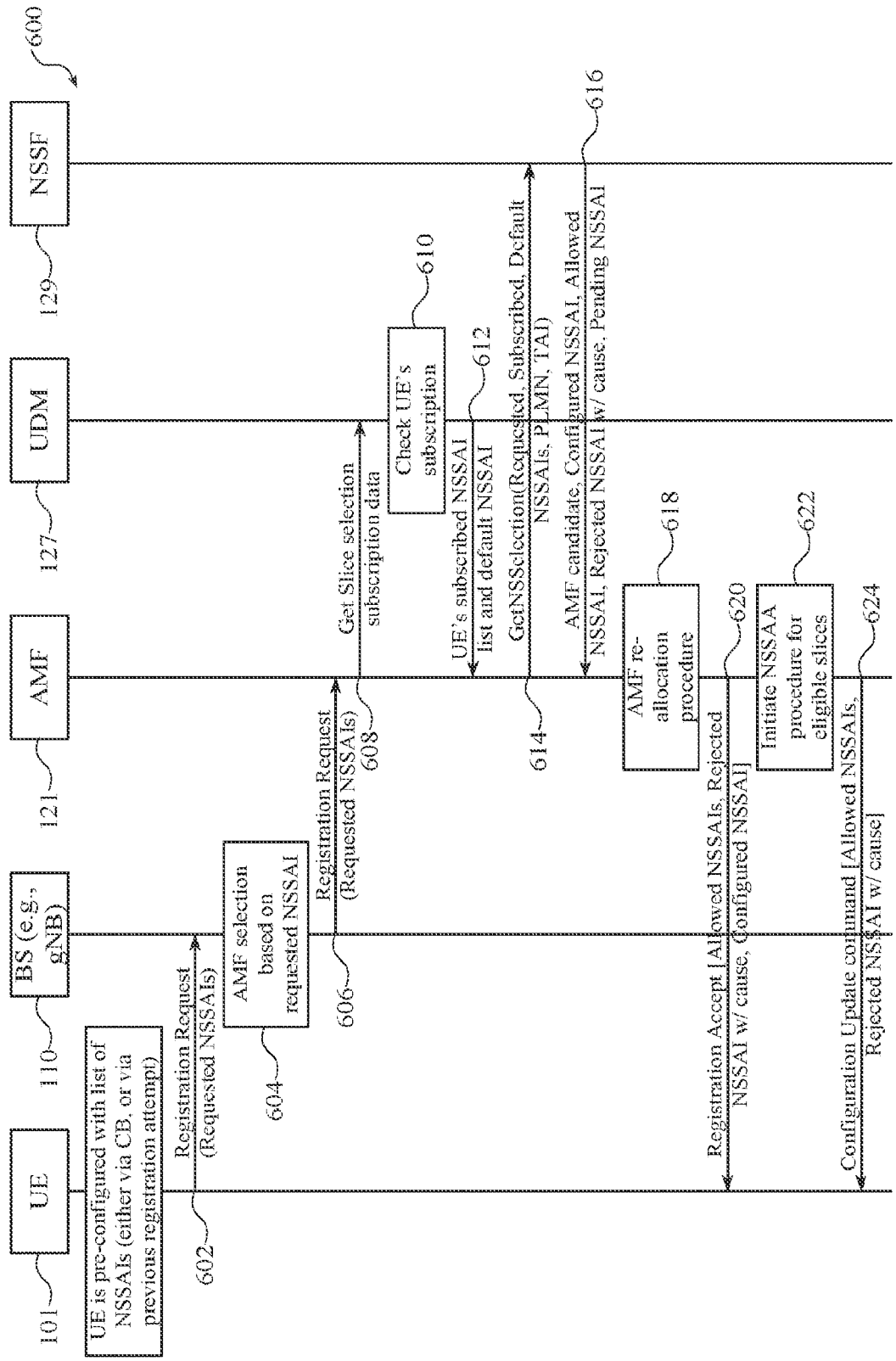
FIG. 6 illustrates a call flow diagram of a method of setup of a network slice for a UE, in connection with various aspects discussed herein.

Referring to FIG. 6, illustrated is a call flow diagram of a method 600 of setup of a network slice for a UE, in connection with various aspects discussed herein. UE 101 can be pre-configured with a list of Network Slice Selection Assistance Information (NSSAI, wherein NSSAI can comprise a set of one or more Single-NSSAI(s) (S-NSSAI(s)), each of which can be associated with a distinct network slice), either via carrier features specific pre-configuration in UE SW, referred to as carrier bundle (CB) or via a previous registration attempt by UE 101. Configured NSSAI, as used herein, can comprise S-NSSAI(s) that are provisioned by an operator and subscribed by a UE (e.g., UE 101). At 602, UE 101 can transmit a Registration Request message comprising one or more Requested NSSAIs (e.g., selected by UE 101 from the configured NSSAI of UE 101) to a BS (e.g., gNB) of RAN 110. At 604, BS 110 can select an AMF 121 based on the requested NSSAI included in the Radio Resource Control (RRC) message. At 606, BS 110 can send the Registration Request message to the selected AMF 121. At 608, AMF 121 can send a message to UDM 127 to get slice selection subscription data for UE 101. At 610, UDM 127 can check the subscription for UE 101. At 612, UDM 127 can send AMF 121 a subscribed NSSAI list and default NSSAI for UE 101. At 614, AMF 121 can send a GetNSSelection message to NSSF 129 that comprises the requested, subscribed, and default NSSAIs for UE 101, along with the Public Land Mobile Network (PLMN) and Tracking Area Identity (TAI). At 616, in response to the GetNSSelection message, NSSF 129 can send AMF 121, for UE 101, an AMF candidate (e.g., if different than AMF 127), Configured NSSAI, Allowed NSSAI (if any), Rejected NSSAI (e.g., those permanently or temporarily rejected for the current registration area or for the entire PLMN) with cause (if any), and Pending NSSAI (if any). At 618, AMF 121 can perform an AMF re-allocation procedure, as appropriate (e.g., if the AMF candidate of 616 is different than the AMF 121 selected at 604). At 620, AMF-127 121 can send UE 101 a Registration Accept message comprising any Allowed NSSAI, any Rejected NSSAI with cause, and the Configured UE for UE 101. At 622, AMF 121 can initiate (e.g., in response to updated NSSAI information for UE 101) a Network Slice-Specific Authentication and Authorization (NSSAA) procedure for any eligible slices. At 624, in response to the NSSAA procedure, AMF 121 can send UE 101 a Configuration Update command indicating Allowed NSSAI (if any) and Rejected NSSAI with cause (if any).

The Third Generation Partnership Project (3GPP) SA2 (Architecture Working Group 2 (WG2)) has identified constraints on simultaneous use of the network slice as an issue. One of the attributes in the GST (Generic Slice Template) documented in GSMA 5GJA NG.116 is "Simultaneous use of the network slice," which describes whether a network slice can be simultaneously used with other network slices. This attribute has the following parameters defined: value (integer), measurement unit (NA), example (0: Can be used with any network slice, 1: Can be used with network slices with same SST [Slice/Service Type] value, 2: Can be used with any network slice with same SD value, 3: Cannot be used with another network slice, 4-15: Operator defined class), and Tags (Character attribute/Functional).

3GPP Release 15 (Rel-15) and Rel-16 specifications do not allow enforcement of constraints related to simultaneous usage of Network Slices, as defined in this attribute.

The SA2 issue is to study: (1) How to enforce the constraints related to simultaneous usage of Network Slices in the UE and in the network, both in roaming and non-roaming scenarios; (2) How to ensure that the identified enforcement solution does not negatively impact the network operations of Rel-15 and Rel-16 5GS deployments; (3) It is understood from the GSMA 5GJA NG.116 document (section 3.4.25 & 3.4.9) that for some network slices, due to Security Isolation and serving network configuration, it may be necessary for the serving network to segregate slice operations, resulting in mutually exclusive slice operations; (4) Simultaneous slice operation restrictions can be present in: Serving network but not in home network, or home network and not in serving network, or both home network and serving network; and (5) Networks can deploy non-standardized Network Slice identifiers, and the issue includes how mutual exclusivity of slices will be deployed in such cases.

Various embodiments can employ techniques discussed herein that facilitate network slice configuration subject to constraints on simultaneous usage of slices. These techniques comprise three different sets of aspects for handling simultaneous usage constraints for network slices, including various options within those techniques.

Various embodiments discussed herein can be employed when a UE (e.g., UE 101 and/or a UE comprising system 400$_{UE}$, etc.) is subscribed to multiple slices (e.g., which can be referred to herein as slices or by S-NSSAI, e.g., S-NSSAI_1 (e.g., or SLICE_1), S-NSSAI_2, S-NSSAI A, S-NSSAI_B, etc.). In various aspects of embodiments discussed herein, the UE can initiate a Registration Request message (e.g., similar to 602). In various such aspects (e.g., the first set of aspects discussed herein, etc.), the Registration Request message can comprise a new capability that indicates whether the UE has support for simultaneous slice usage constraints. In response to the Registration Request message, the NW can send a Registration Accept message (e.g., similar to 620), which can, in aspects, indicate one or more network slices that were selected based on the support for simultaneous slice usage constraints by the UE.

Figure 7:
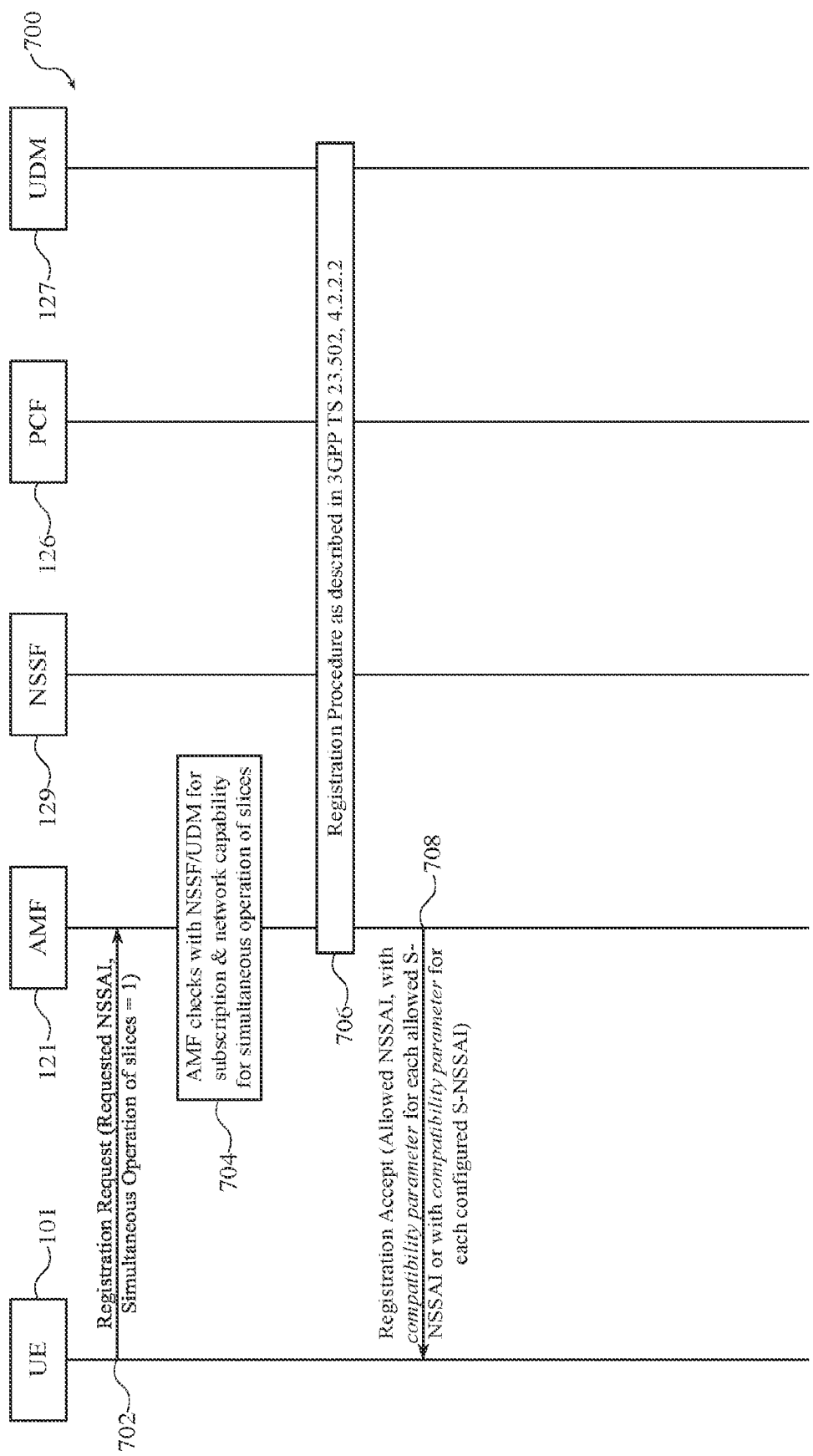
FIG. 7 illustrates a first example call flow of slice registration in connection with simultaneous slice usage constraints, according to various aspects discussed herein.

Referring to FIG. 7, illustrated is a diagram of a first example call flow 700 of slice registration in connection with simultaneous slice usage constraints, according to various aspects discussed herein. At 702, UE 101 can send a Registration Request message to AMF 121, comprising the Requested NSSAI (e.g., similar to 602) and can also comprise (in various aspects) an indication that UE has support for simultaneous slice usage constraints. At 704, the AMF can check with UDM 127 for UE subscription information and with NSSF 129 for network capability for simultaneous operation of slices in connection with the Requested NSSAI. At 706, AMF 121, NSSF 129, PCF 126, and UDM 127 can register UE 101 to at least one (and potentially more than one, depending on slice compatibility, etc.) of the Requested NSSAI according to the registration procedure discussed herein and at 3GPP Technical Specification (TS) 23.502 at 4.2.2.2. At 708, AMF 121 can send the UE a Registration Accept message indicating Allowed NSSAI (e.g., similar to 620) and also indicating a compatibility parameter for each such S-NSSAI (e.g., indicating slices with which that slice is compatible or incompatible for simultaneous operation, according to various aspects discussed herein). In some aspects, the Registration Accept message can also indicate a compatibility parameter for each configured S-NSSAI for the UE.

Figure 8:
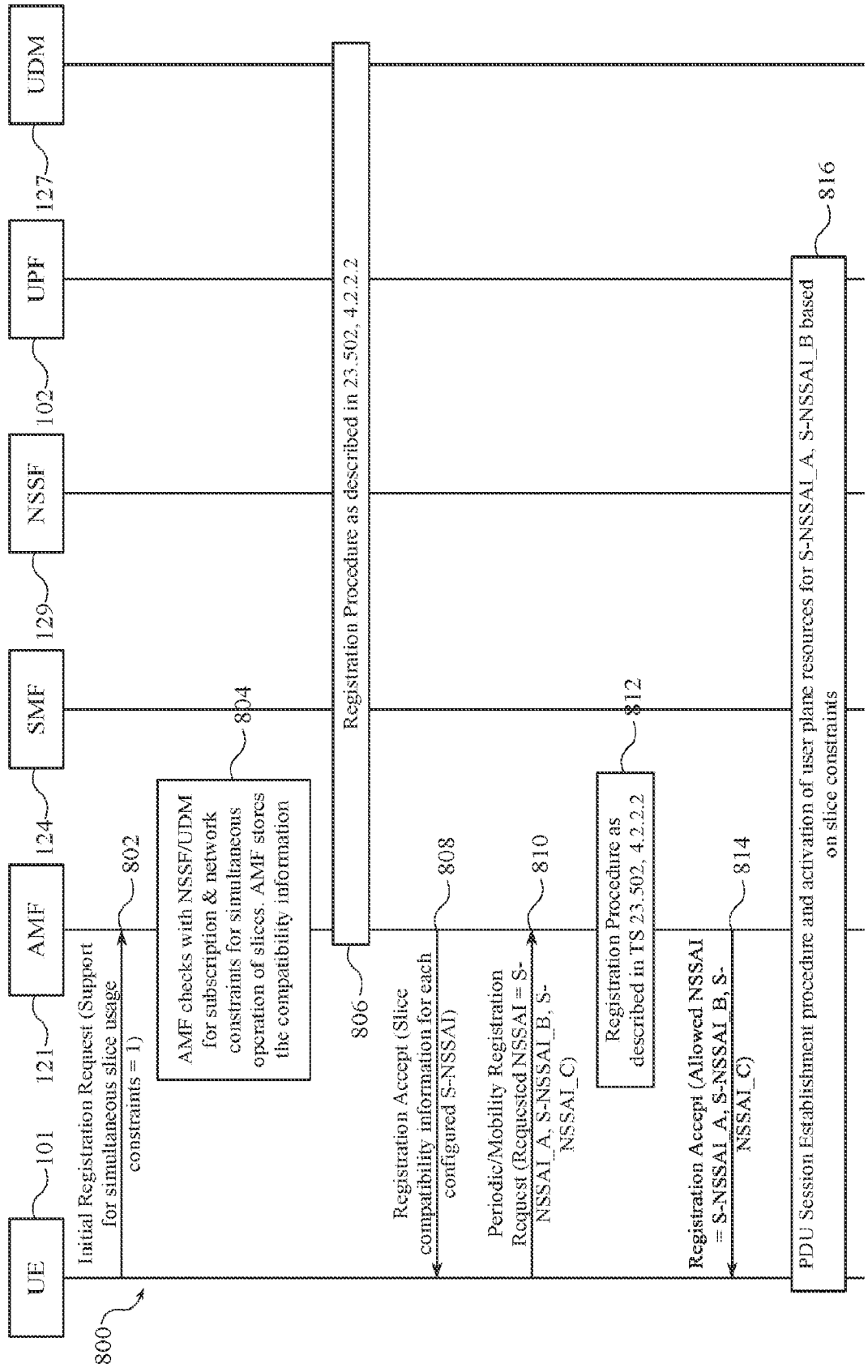
FIG. 8 illustrates a second example call flow of slice registration in connection with simultaneous slice usage constraints, according to various aspects discussed herein.

Referring to FIG. 8, illustrated is a diagram of a second example call flow 800 of slice registration in connection with simultaneous slice usage constraints, according to various aspects discussed herein. At 802, UE 101 can send an Initial Registration Request message to AMF 121 comprising an indication that UE supports simultaneous slice usage constraints (and can also request registration for initial Requested NSSAI). At 804, the AMF can check with UDM 127 for UE subscription information and with NSSF 129 for network capability for simultaneous operation of slices in connection with the Configured NSSAI of the UE, and the AMF can store the compatibility information.

As an example, shown in Table 1 below, the Configured NSSAI can comprise S-NSSAI_A (eMBB), S-NSSAI_B (eMBB), S-NSSAI_C (eMBB), and S-NSSAI_D (URLLC), having the following compatibility information: (a) S-NSSAI_A, S-NSSAI_B, and S-NSSAI_C can be simultaneously registered with each other, but none can be simultaneously registered with S-NSSAI_D; (b) S-NSSAI_A and S-NSSAI_B can have simultaneously active PDU sessions with each other, but neither can have simultaneously active PDU sessions with S-NSSAI_C; and (c) S-NSSAI_A and S-NSSAI_B can have simultaneously established user plane resources with each other.

TABLE 1

Example Slice compatibility information provided to the UE

| A Configured NSSAI list | B SST | C SD | D List of S-NSSAIs with which the current S-NSSAI is allowed to register simultaneously | E List of S-NSSAIs with which UE and network may simultaneously establish PDU Session associated with each of the registered slices | F List of S-NSSAIs for which which UE and network are allowed to simultaneously have active user plane resources for the established PDU sessions |
|---|---|---|---|---|---|
| S-NSSAI-A | eMBB | 1 | S-NSSAI-B, S-NSSAI-C | S-NSSAI-B | S-NSSAI-B |
| S-NSSAI-B | eMBB | 2 | S-NSSAI-A, S-NSSAI-C | S-NSSAI-A | S-NSSAI-A |
| S-NSSAI-C | eMBB | 3 | S-NSSAI-A, S-NSSAI-B | Nil | Nil |
| S-NSSAI-D | uRLLC | 4 | Nil | Nil | Nil |

In various aspects, compatibility information (e.g., a compatibility parameter, etc.) for a network slice or S-NSSAI as discussed herein can indicate, for that S-NSSAI, which other S-NSSAI(s) (e.g., of configured NSSAI, of requested NSSAI, or of allowed NSSAI) are compatible or incompatible with that S-NSSAI with respect to one or more of: (a) compatibility or incompatibility of network slices to be simultaneously registered for a UE; (b) compatibility or incompatibility of network slices to have simultaneously established PDU sessions for a UE; (c) compatibility or incompatibility of network slices to have simultaneously active user plane resources for established PDU sessions of the UE, etc. In some cases, the indication can be explicit (e.g., S-NSSAI_1 is incompatible of being simultaneously registered with S-NSSAI_2, or of having simultaneous active PDU sessions with S-NSSAI_2, etc.). In other cases, the indication can be implicit (e.g., S-NSSAI_1 is compatible to be simultaneously registered with S-NSSAI_3 or S-NSSAI_4, but no explicit indication of compatibility/incompatibility is provided for configured S-NSSAI_2, implicitly indicating that S-NSSAI_1 is incompatible of being simultaneously registered with S-NSSAI_2, etc.).

In the example of table 1, though S-NSSAI-A, S-NSSAI-B and S-NSSAI-C are allowed to register simultaneously (i.e., all 3 S-NSSAIs may be part of the Allowed NSSAI list received from the network at the same time), the UE is allowed to simultaneously establish the PDU Sessions and have active user plane resources for PDU sessions only associated with S-NSSAI-A and S-NSSAI-B. Thus, if the UE wishes to establish PDU session for S-NSSAI-C and activate user plane resources, it shall first ensure that PDU sessions associated with S-NSSAI-A and S-NSSAI-B are released or are not yet established.

Also, as seen in this example, the uRLLC slice, S-NSSAI-D, is not allowed to register simultaneously with the other configured NSSAIs. Thus, if the UE wishes to access S-NSSAI-D, the UE can first initiate a mobility or periodic registration procedure with the network with the Requested NSSAI set to include S-NSSAI-D. The UE can also ensure PDU Sessions associated with incompatible slices are either released implicitly and indicated to the network via a PDU Session status IE in a Registration Request, or released explicitly via a PDU Session Release request.

At 806, AMF 121, SMF 124, NSSF 129, UPF 102, and UDM 127 can register UE 101 to one or more (and potentially more than one, depending on slice compatibility, etc.) S-NSSAI of the initial Requested NSSAI according to the registration procedure discussed herein and at 3GPP Technical Specification (TS) 23.502 at 4.2.2.2. At 808, AMF 121 can send the UE a Registration Accept message indicating slice compatibility information for each Configured S-NSSAI of the UE (and can also indicate the one or more S-NSSAI registered at 806 as allowed NSSAI).

At 810, the UE can send a periodic or mobility registration request to the AMF comprising Requested NSSAI (e.g., S-NSSAI_A, S-NSSAI_B, and S-NSSAI_C). In various aspects, the requested NSSAI at 810 can be selected by the UE to be compatible for simultaneous registration. At 812, the AMF (e.g., and other entities) can register the UE to each S-NSSAI of the requested NSSAI (e.g., however, in other aspects, one or more can be rejected for reason(s) other than slice incompatibility). At 814, the AMF can send the UE a registration accept message indicating Allowed NSSAI comprising S-NSSAI_A, S-NSSAI_B, and S-NSSAI_C. At 816, PDU sessions can be established and user plane resources activated for one or more compatible S-NSSAIs of the allowed NSSAI (e.g., S-NSSAI_A and S-NSSAI_B, as shown in FIG. 8).

In aspects in connection with example call flow 800, 802 through 808 can occur a single time, at initial registration to a PLMN, while 810 through 816 (or similar acts) can occur potentially multiple times (e.g., with potentially varying requested and allowed NSSAI) as the UE sends periodic and/or mobility registration requests.

In a first set of aspects, the NW can create an Allowed NSSAI list based on the Requested NSSAI, similar to 616-620 in FIG. 6. Additionally, however, each S-NSSAI in the Allowed NSSAI can comprise a list of compatible S-NSSAIs which defines the slices with which that S-NSSAI can simultaneously work. Referring to FIG. 9, illustrated is an example table showing an example of three allowed slices, indicating SST values, optional SD values, and compatibility between slices, according to various aspects discussed herein. In the first set of aspects, the NW will not reject an S-NSSAI due to slice incompatibility issues when the UE indicates support for simultaneous slice usage constraints (however, the NW can still reject a S-NSSAI for other reasons, e.g., quota unavailable, NSAAA failure, etc.). Additionally, if support for simultaneous slice usage constraints is not supported by the UE, the network is free to reject the slices due to slice incompatibility issues (e.g., for 3GPP Rel-16 UBS, etc.).

In a second set of aspects, each S-NSSAI in the list of Configured NSSAI for the UE can indicate a list of compatible S-NSSAIs (e.g., such as in FIG. 9) with which it can simultaneously work. The AMF can ensure that all the S-NSSAIs listed in the Compatible NSSAI list are part of the Configured NSSAI list. Based on a UE priority policy (e.g., which set of slices the user/UE is interested in), the UE can initiate a new Registration procedure indicating the Requested NSSAI (e.g., as in FIGS. 7-8). Based on the Compatible NSSAI list, the UE can ensure incompatible slices are not simultaneously included in the Requested NSSAI list. If incompatible slices are included, the AMF can reject the incompatible slices, and only allow the compatible set of slices which are allowed to register simultaneously.

Additionally, in connection with the second set of aspects, the UE and/or the AMF can be configured to select slices based on one or more criteria, for example: (1) ensuring the maximum number of slices from the Requested NSSAI list is "Allowed" (e.g., preferring the largest group of slices which are compatible) and/or (2) treating the first slice listed in the Requested NSSAI list as the highest priority or the registration request message explicitly indicates priority information for the first network slice, and ensuring that largest group of compatible slices which includes the first slice are "Allowed."

In a third set of aspects, the UE can indicate awareness of slice constraints by including a new Information Element (IE) indicting Support for Simultaneous Slice usage constraints in the registration request (e.g., of FIGS. 7-8, etc.).

Additionally, the AMF can include a new IE indicating Slice Compatibility in the registration accept (e.g., of FIGS. 7-8, etc.). The Slice Compatibility IE can indicate slice compatibility or incompatibility between all slices to which the UE is subscribed. To provide this information, serving AMF can fetch: (a) the subscribed NSSAIs from UDM (of the UE's home network) and, based on the subscribed NSSAI; (b) the received slice constraints from the serving NSSF; and (c) Based on the constraints based on GST attributes provided by the Network Slice Provider, can send the Slice Compatibility IE to UE.

In various embodiments, the Slice Compatibility IE can also comprise information about AMF re-allocation (e.g., via an indication, for each pair of incompatible slices, whether or not they are served by the same AMF or different AMFs, etc.). The AMF re-allocation information can be based on the serving network configuration on how the serving network has chosen to serve independent slices.

In the third set of aspects, the UE can send a Registration request with requested S-NSSAI (e.g., SLICE_A, SLICE_B, as in FIGS. 7-8), which can also comprise an indication of support for slice activation based on constraints. In response, the AMF can send a registration accept with allowed S-NSSAI (e.g., as in FIGS. 7-8) that can comprise slices that are incompatible for simultaneous use, and which can also comprise a Slice Compatibility IE that specifies which slices are allowed to be simultaneously used.

In the third set of aspects, the UE follows slice compatibility rules set in the Slice Compatibility IE when initiating any PDU session and activating a slice. The rules in the Slice Compatibility IE are specific to the serving network only, and registration procedure on a new network can result in new slice constraint rules for the UE.

In the third set of aspects, there are multiple options for addressing the question of potential registration by the UE on incompatible slices.

In a first option, the UE is allowed to register for constrained slices, but the decision to activate a PDU session is based on the Slice Compatibility IE.

An example of the first option is a scenario wherein the UE already has an active PDU session (e.g., created over SLICE_A), SLICE_A and SLICE_B are provided in allowed NSSAI but (per the Slice Compatibility IE) the UE can activate a PDU session on only one of those slices a time. If SLICE_B requires a new PDU session to be established and activated, the UE can either (a) start to release the current PDU session(s) that are active on SLICE_A using a "PDU Session Status IE" in a Service Request or Registration Request or (b) wait for user plane resources to be released (i.e., enter IDLE state at UE) before triggering a PDU session on SLICE_B.

The first option addresses slices that are subject to NSSAA. After successful NSSAA, the UE can move the slices to the "allowed list" but still uses the information provided in "Slice Compatibility IE" to activate PDU session(s) on compatible slices.

In a second option, the UE is allowed to register simultaneously for constrained slices and establish simultaneous PDU sessions on constrained slices, but with no simultaneously active user plane resources on constrained slices.

An example of the second option is a scenario wherein the UE already has an active PDU session (e.g., created over SLICE_A), SLICE_A and SLICE_B are provided in allowed NSSAI but (per the Slice Compatibility IE) the UE can establish simultaneous PDU sessions on both slices, but only one slice can have user plane resources active. If a new PDU session for SLICE_B requires user plane resources to be active, the UE can either (a) start to release the current user plane resources that are active on SLICE_A using a "PDU Session Status IE" in Service Request or Registration Request or (b) wait for user plane resources to be released on SLICE_A before establishing user plane resources on SLICE_B. To activate user plane resources on SLICE_B, the UE may include the "Uplink Data Status" IE in Registration Request or Service Request. In various aspects, the UE can check for slice compatibility before triggering a Service Request or Registration Request to request user plane resources on other slices.

In a third option, the UE is not allowed to register for constrained slices. An example of the third option is a scenario wherein a UE sends a Registration request with a requested S-NSSAI (e.g., SLICE_A, SLICE_B) along with an indication of support for slice activation based on constraints, and the AMF sends a registration accept with allowed S-NSSAI comprising only SLICE_A, wherein the registration accept also comprises a Slice Compatibility IE that specifies which slices are allowed to be simultaneously used. After PDU session activation over SLICE_A, if the UE intends to activate a PDU session over SLICE_B, then the UE first triggers a Registration Request with SLICE_B as a requested slice and locally deactivates/releases all PDU session(s) that are using SLICE_A, and indicates this to the network by including the PDU Session Status IE, and indicating the PDU Session ID corresponding to SLICE_A as inactive.

In connection with the third option, when activating SLICE_B, the UE can omit the 5G S-Temporary Mobile Subscriber Identity (5G S-TMSI) associated with the AMF for SLICE_A in messaging to the BS (e.g., gNB) during the RRC Connection setup procedure, so that the BS does not select the same AMF again. As an example, if the UE has requested SLICE_A and SLICE_B and the Slice Compatibility IE received from network indicates that both SLICE_A and SLICE_B cannot be activated simultaneously because they are served by different AMFs, then, if the network has activated SLICE_A initially and the UE now wants to activate SLICE_B, the UE omits the 5G S-TMSI in messaging to the BS (e.g., gNB). By omitting the 5G S-TMSI, the UE can prevent the BS from selecting the same AMF again for activating SLICE_B. These aspects can provide a solution for scenarios wherein, after registration accept with allowed S_NSSAI consisting of SLICE_B, the UE triggers a PDU session. For slices with NSSAA that are already in allowed list, omission of the 5G S-TMSI can trigger registration via the appropriate AMF.

Additionally, techniques associated with the third option can relate to AMF selection by a BS (e.g., gNB). On receiving the requested slice information in the NSSAI inclusion mode in RRC CONNECTION ESTABLISHMENT, the BS can select the respective AMF based on the first slice that is indicated in the RRC CONNECTION ESTABLISHMENT by the UE when switching between independent slices involving registration to different AMFs.

In various aspects of the third option, a backoff timer can be employed in connection with slice selection. In some scenarios, depending on applications running in a UE requiring activation of incompatible slices (e.g., SLICE_A or SLICE_B), these applications can potentially cause the network to constantly switch between different constraint slices through re-registration procedure(s) or deactivation and re-activation of PDU sessions. To limit rapid switching between slices, in various aspects, the network can provide (e.g., in a REGISTRATION ACCEPT or a PDU SESSION ESTABLISHMENT ACCEPT) a backoff timer, such that the UE can only activate a mutually constrained slice after the backoff timer expires.

As one example scenario involving a backoff timer, the UE has requested SLICE_A and SLICE_B, and the Slice Compatibility IE received from network indicates that both SLICE_A and SLICE_B cannot be activated simultaneously because they are served by different AMFs, and the AMF provides, in the REGISTRATION ACCEPT, a backoff timer that indicates to the UE that it cannot activate SLICE_B until the backoff timer expires. Similarly, this can be applicable in a scenario wherein both SLICE_A and SLICE_B are sent in ALLOWED NSSAI but are present in the Slice Compatibility IE indicating that both SLICE_A and SLICE_B cannot have simultaneous active PDU sessions. In such a scenario, the AMF can indicate to the UE that it cannot activate PDU session on SLICE_B until the slice constraint backoff timer expires.

In further aspects of the third option, various techniques can provide for UE slice support over non-3GPP and 3GPP Access Technologies. If the UE is registered over different AMFs on 3GPP and non-3GPP Access technologies, then it can choose to activate mutually exclusive slices simultaneously independently. As one example scenario, if a UE wishes to active SLICE_A and SLICE_B simultaneously and the AMF on one of the accesses (e.g., a 3GPP access) sends the UE a Slice Compatibility IE indicating that AMF does not allow simultaneous activation of SLICE_A and SLICE_B, if the UE can find a separate non-3GPP access which is served by a different PLMN, the UE can attempt to activate the SLICE_B on the non-3GPP access. If the UE non-3GPP access later handovers to the same PLMN AMF on 3GPP access as SLICE_A, then the SLICE_B context and PDU sessions can be dropped (as derived from the Slice Compatibility IE) and the SLICE_A PDU sessions will be continued. This technique can provide for activation of mutually independent slices simultaneously via multiple access technologies.

Additionally, in connection with the third set of aspects, techniques can be employed wherein the network can change the slice constraint information dynamically when the UDM detects a change in the subscribed NSSAI or the Network slice provider changes the slice configuration. As one example scenario, when a UE has requested SLICE_A and SLICE_B and the Slice Compatibility IE received from network indicates that both SLICE_A and SLICE_B cannot be activated simultaneously because they are served by different AMFs, if the network has activated SLICE_A initially and the UDM detects a change in the subscribed NSSAI indicating that the UE is no longer subscribed for SLICE_B, then the AMF can indicate to the UE to remove SLICE_B from the slice constraints IE. These techniques can be implemented via the AMF triggering a Configuration Update Command indicating removal of SLICE_B from the Slice Constraint IE (or other corresponding changes to the Slice Constraint IE based on detected changes in the subscribed NSSAI or the slice configuration, etc.).

Referring to FIG. 10, illustrated are example tables showing compatibility between slices based on explicit indication of slice incompatibility, according to the third set aspects discussed herein. The bottom right table of FIG. 10 shows an example of UE configured slices for a serving network, and the bottom left shows SST values associated with those slice types. The top table of FIG. 10 shows example incompatibility information that can be provided in connection with those slices, along with whether incompatible slices are served by the same AMF. Because the top table only lists slice incompatibilities, the omission of slice 6, for example, indicates that slice 6 can be activated simultaneously with all other registered slices.

Referring to FIG. 11, illustrated are example tables showing compatibility between slices via indication of slice incompatibility based on SST, according to the third set aspects discussed herein. The bottom right table of FIG. 11 shows an example of UE configured slices for a serving network, and the bottom left shows SST values associated with those slice types. The top table of FIG. 11 shows example incompatibility information that can be provided in connection with those slices, along with whether slices of incompatible SSTs are served by the same AMF. Although FIG. 11 provides an example based on SST, similar techniques can be employed in connection with indicating incompatibility based on SD.

Referring to FIG. 12, illustrated are example tables showing compatibility between slices via indication of slice incompatibility based on GSMA-identified constraints, according to the third set aspects discussed herein. The UE configured slices for the serving network can be the same as in FIGS. 10 and 11. The bottom table of FIG. 12 shows exclusion types indicated in connection with the GST examples discussed above and provided by GSMA. The top table of FIG. 12 shows example incompatibility information that can be provided in connection with configured slices, along with incompatible slice constraints and exclusion types. As with FIGS. 10 and 11, the lack of an indicated constraint between slices implicitly indicates the UE can simultaneously operate on those slices.

FIGS. 13-19 illustrate example call flow diagrams in connection with the first, second, and third sets of aspects. In various embodiments, after registration (e.g., according to FIG. 7 or FIG. 8), techniques such as those discussed in connection with FIGS. 13-19 can be employed to one or more of: (a) change the allowed network slice(s) for the UE (e.g., adding and/or removing registered network slices based on apps or services to be employed, etc.); (b) establishing and/or releasing one or more PDU sessions for registered network slices; and/or (c) activation and/or release of user plane resources for PDU sessions on registered network slices (e.g., those with active PDU sessions, etc.).

Figure 13:
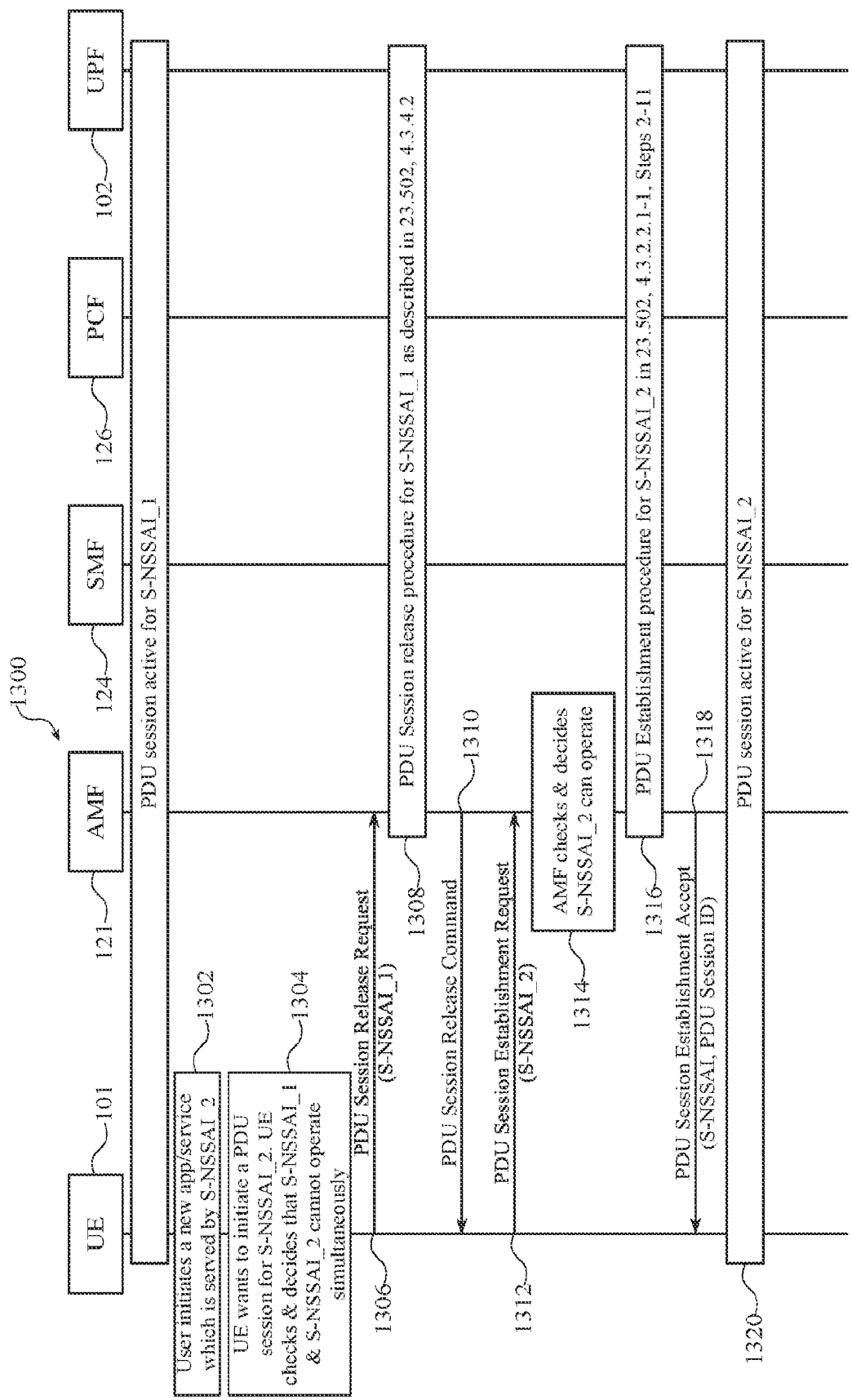
FIG. 13 illustrates a diagram of an example call flow involving a UE selectively establishing a Protocol Data Unit (PDU) session, in connection with various aspects discussed herein.

Referring to FIG. 13, illustrated is a diagram of an example call flow 1300 involving a UE selectively establishing a PDU session, in connection with various aspects discussed herein. In one example scenario, flow 1300 can be employed when a network has allowed a UE to register incompatible slices, and the UE decides to selectively establish a PDU session on a slice incompatible with one having an active PDU session. In flow 1300, there is a PDU session active for S-NSSAI_1 for UE 101. At 1302, a user of UE 101 can initiate a new app or service served by S-NSSAI_2. At 1304, the UE wants to initiate a PDU session for S-NSSAI_2, checks, and determines that S-NSSAI_1 and S-NSSAI_2 cannot operate simultaneously (e.g., as indicated by the AMF via the Registration Accept, in a list of Configured NSSAI, in a slice compatibility IE, etc.). At 1306, the UE can send the AMF a PDU session release request for S-NSSAI_1. At 1308, a PDU session release procedure can be performed for S-NSSAI_1, which can include the AMF sending and the UE receiving a PDU Session Release Command at 1310, indicating successful release of the PDU session by the network. At 1312, the UE can send a PDU session establishment request for S-NSSAI_2. At 1314, the AMF can check and determine if S-NSSAI_2 can operate for the UE. If it can, at 1316, a PDU establishment procedure can be performed for S-NSSAI_2, and at 1318, the AMF can send the UE a PDU session establishment accept message indicating S-NSSAI_2 and a PDU session ID. At 1320, the PDU session is active for S-NSSAI_2.

In various embodiments, techniques can be employed wherein a UE can indicate that a requested PDU session is a priority PDU session for the UE relative to other PDU sessions. In embodiments employing such techniques, a UE can send PDU Session Establishment Request with an Allowed NSSAI, and the request can comprise a Priority Release slice IE that informs the network this is a priority PDU session for the UE. Depending on the embodiment, if the IE is present or set to 1, the NW can release active PDU session(s) of S-NSSAI(s) which are incompatible with the S-NSSAI for which the PDU session is requested, and if the IE is absent or set to 0, the NW can reject the PDU session if any PDU session(s) are active with S-NSSAI(s) incompatible with the S-NSSAI for which the PDU session is requested.

Figure 14:
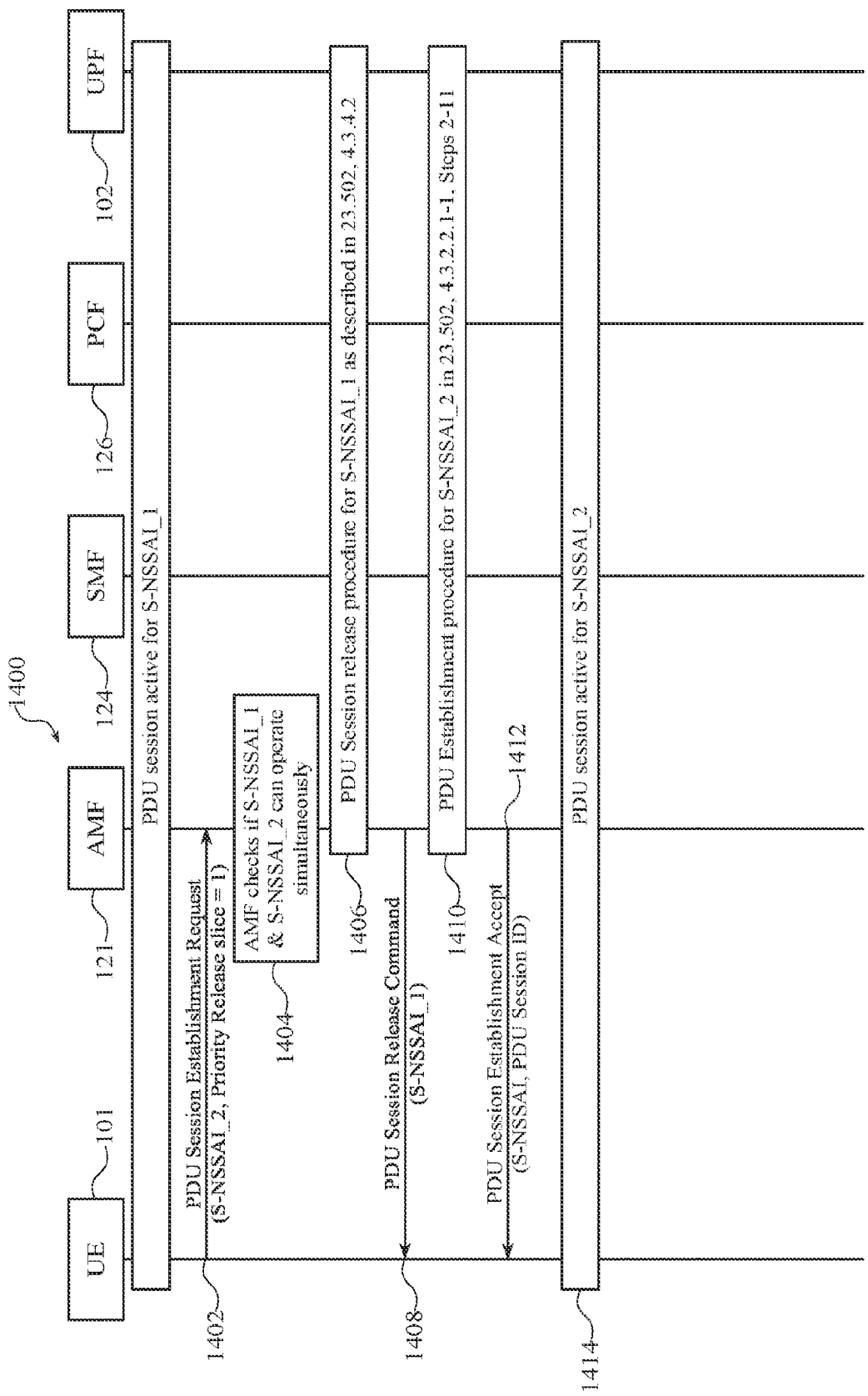
FIG. 14 illustrates a diagram of a first example call flow employing a priority release slice IE or value, in connection with various aspects discussed herein.
Figure 15:
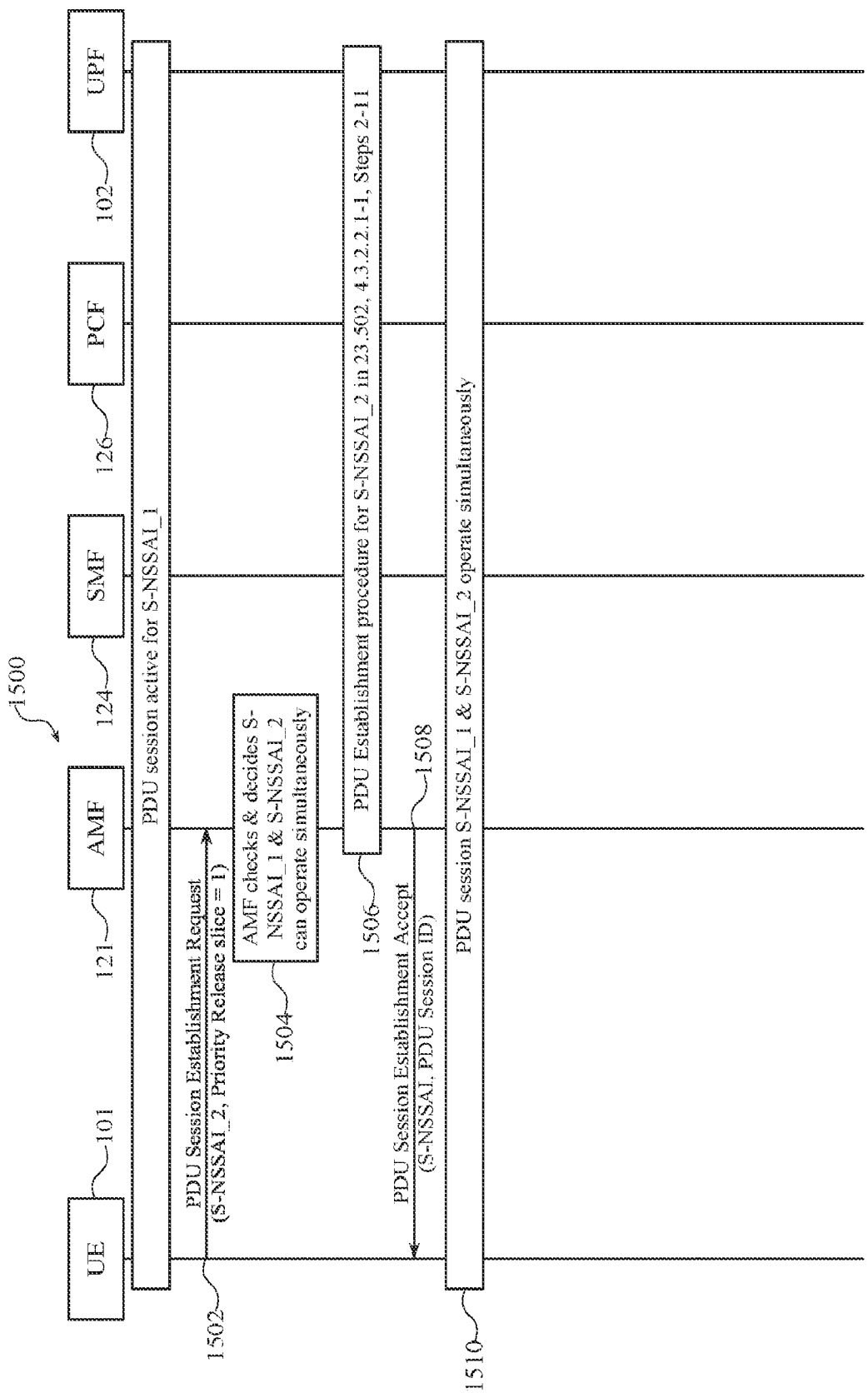
FIG. 15 illustrates a diagram of a second example call flow employing the priority release slice Information Element (IE) or value, in connection with various aspects discussed herein.
Figure 16:
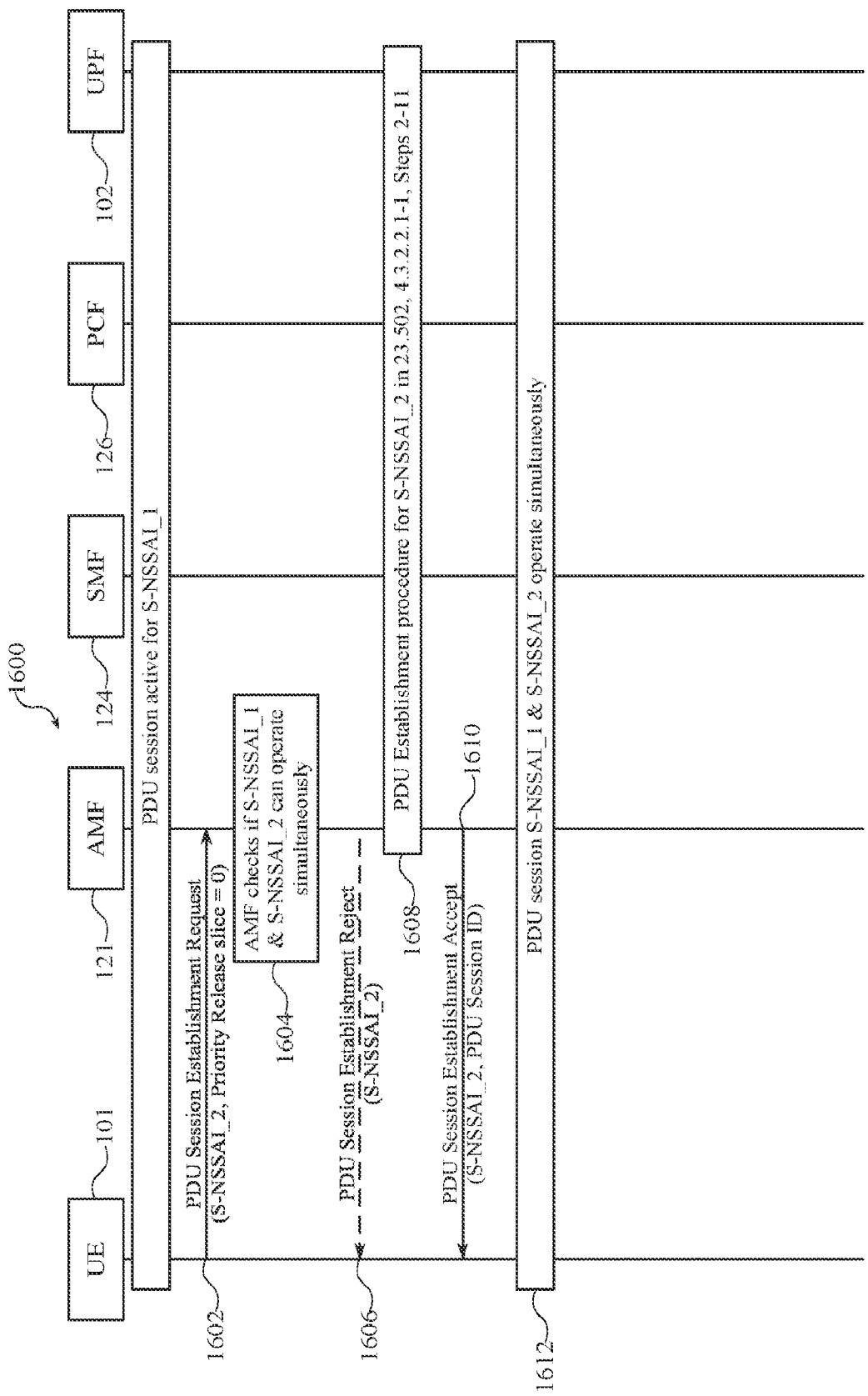
FIG. 16 illustrates a diagram of a third example call flow employing the priority release slice IE or value, in connection with various aspects discussed herein.

In embodiments employing these techniques, when the UE wants to establish a PDU session for an S-NSSAI, the UE can check if there are any active PDU sessions with incompatible slices. If there are any, the UE can set "Priority Release slice" to 1 (or include the IE, depending on the embodiment) if the app/service belonging to that S-NSSAI is in the foreground and not initiate PDU session establishment request if the request is for a background app/service. If there are not any, the UE can set "Priority Release slice" to 0 (or omit the IE, depending on the embodiment). FIGS. 14-16 illustrate example call flows for techniques associated with priority release slice.

Referring to FIG. 14, illustrated is a diagram of a first example call flow 1400 employing a priority release slice IE or value, in connection with various aspects discussed herein. In call flow 1400, a PDU session is active for S-NSSAI_1. At 1402, the UE can send a PDU Session Establishment request to the AMF indicating S-NSSAI_2 with a priority release slice set to 1. At 1404, the AMF can check whether S-NSSAI_1 and S-NSSAI_2 can operate simultaneously. In this example they cannot, and because priority release slice is set to 1 for S-NSSAI_2, at 1406, a PDU session release procedure (e.g., per 3GPP TS 23.502, 4.3.4.2) can be performed for S-NSSAI_1. At 1408, the AMF can send the UE a PDU session release command for S-NSSAI_1. At 1410, a PDU establishment procedure (e.g., per 3GPP TS 23.502, 4.3.2.2.1-1 at steps 2-11) can be performed for S-NSSAI_2. At 1412, the AMF can send the UE a PDU session establishment accept message for S-NSSAI_2, indicating a PDU session ID of the established PDU session. At 1414, the PDU session is active for S-NSSAI_2.

Referring to FIG. 15, illustrated is a diagram of a second example call flow 1500 employing the priority release slice IE or value, in connection with various aspects discussed herein. In call flow 1500, a PDU session is active for S-NSSAI_1. At 1502, the UE can send a PDU Session Establishment request to the AMF indicating S-NSSAI_2 with a priority release slice set to 1. At 1504, the AMF can check whether S-NSSAI_1 and S-NSSAI_2 can operate simultaneously. In this example they can, and at 1506, a PDU session establishment procedure (e.g., per 3GPP TS 23.502, 4.3.2.2.1-1 at steps 2-11) can be performed for S-NSSAI_2. At 1508, the AMF can send the UE a PDU session establishment accept message for S-NSSAI_2, indicating a PDU session ID of the established PDU session. At 1510, PDU sessions are simultaneously active for both S-NSSAI_1 and S-NSSAI_2.

Referring to FIG. 16, illustrated is a diagram of a third example call flow 1600 employing the priority release slice IE or value, in connection with various aspects discussed herein. In call flow 1600, a PDU session is active for S-NSSAI_1. At 1602, the UE can send a PDU Session Establishment request to the AMF indicating S-NSSAI_2 with a priority release slice set to 0. At 1604, the AMF can check whether S-NSSAI_1 and S-NSSAI_2 can operate simultaneously. If they cannot operate simultaneously, then at 1606, the AMF sends the UE a PDU session establishment reject message indicating S-NSSAI_2, and call flow 1600 ends. If, however, they can operate simultaneously, at 1608, a PDU session establishment procedure (e.g., per 3GPP TS 23.502, 4.3.2.2.1-1 at steps 2-11) can be performed for S-NSSAI_2. At 1610, the AMF can send the UE a PDU session establishment accept message for S-NSSAI_2, indicating a PDU session ID of the established PDU session. At 1612, PDU sessions are simultaneously active for both S-NSSAI_1 and S-NSSAI_2.

Figure 17:
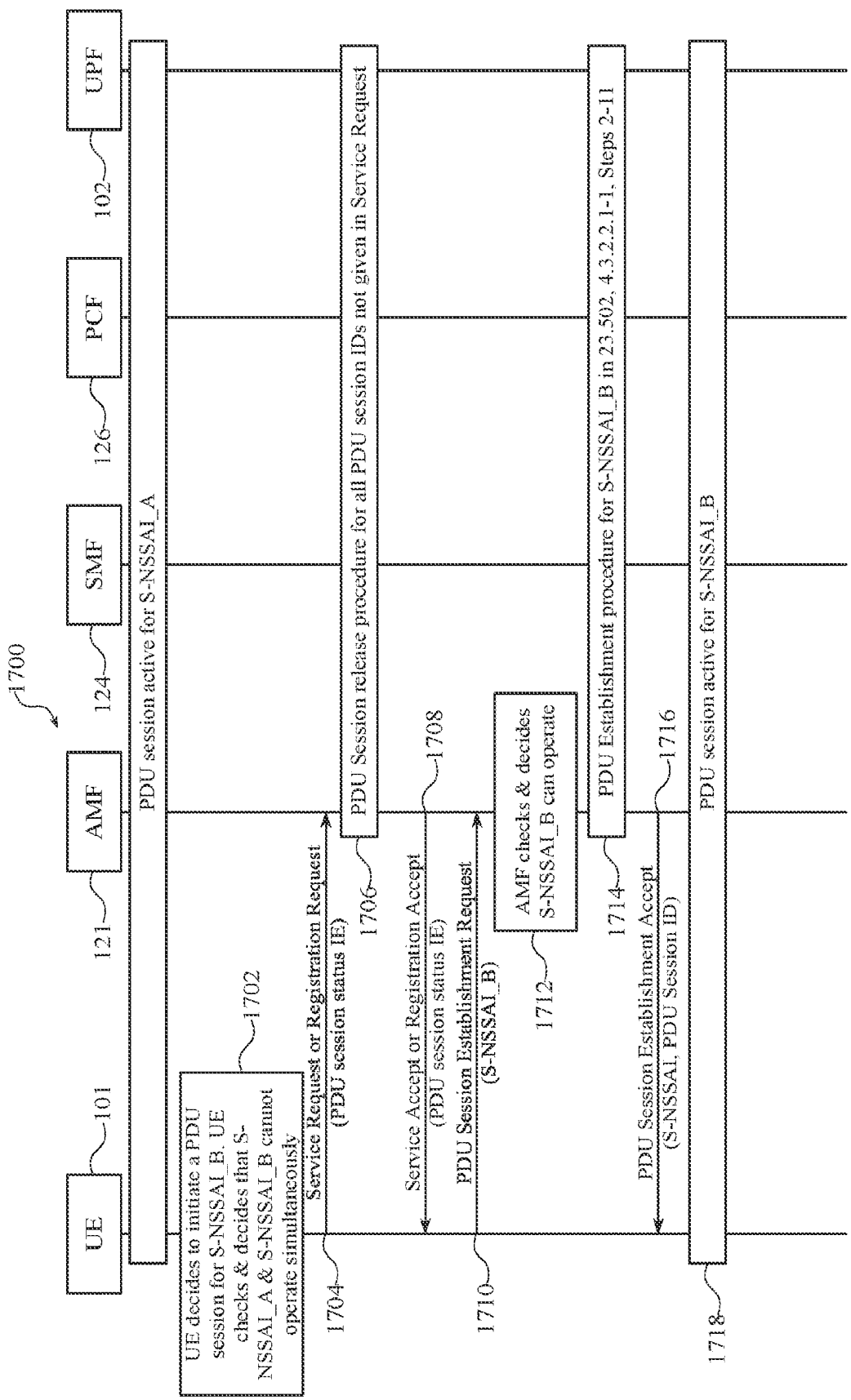
FIG. 17 illustrates a diagram of an example call flow using a PDU session status IE to implicitly release PDU session(s), in connection with various aspects discussed herein.

Referring to FIG. 17, illustrated is a diagram of an example call flow 1700 using a PDU session status IE to implicitly release PDU session(s), in connection with various aspects discussed herein. In call flow 1700, a PDU session is active for S-NSSAI_A. At 1702, based on user activity, or UE policy, the UE decides to initiate a PDU session for S-NSSAI-B, checks, and determines that S-NSSAI_A and S-NSSAI_B cannot operate simultaneously. At 1704, the UE sends one of a service request or a registration request comprising a PDU session status IE to the AMF. At 1706, in response to the PDU session status IE, PDU session release procedure(s) can be performed by the network for all PDU session IDs which are not included in the PDU session status IE in the Service Request or registration request. At 1708, the AMF can send one of a Service Accept or a Registration Accept message (depending on the message of 1704) to the UE that comprise a "PDU Session Status" IE. At 1710, having locally released the PDU session(s) for which implicit release was triggered (e.g., S-NSSAI_A) and received confirmation that the network has released the incompatible PDU sessions, the UE can send a PDU session establishment request to the AMF indicating S-NSSAI_B. At 1712, the AMF can check and determine that the UE can operate on S-NSSAI_B. At 1714, a PDU establishment procedure can be performed for S-NSSAI_B. At 1716, the AMF can send the UE a PDU session establishment accept message indicating S-NSSAI_B and the PDU session ID of the PDU session established for it. At 1718, the PDU session is active for S-NSSAI_B.

Figure 18:
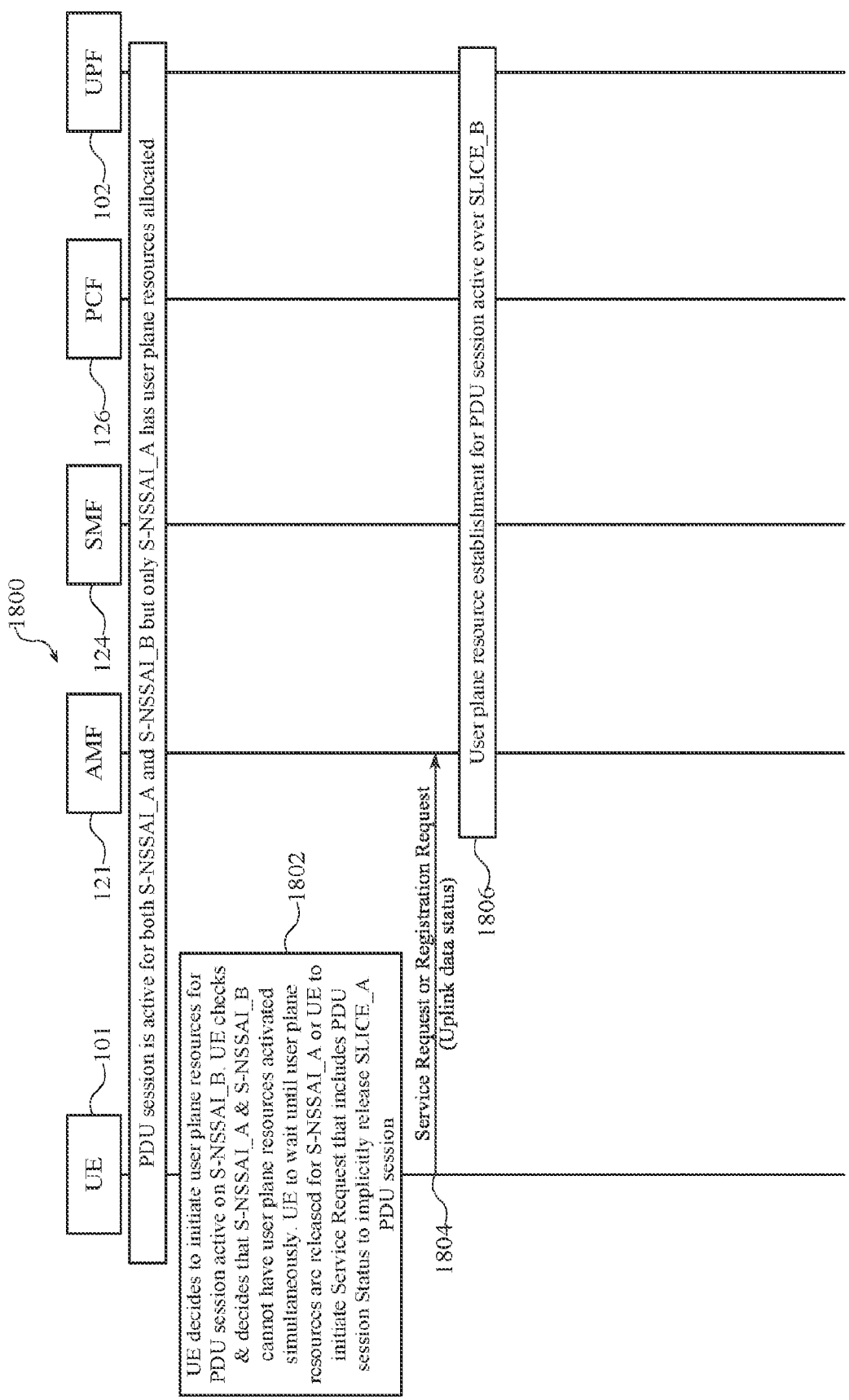
FIG. 18 illustrates a diagram of an example call flow using uplink data status to establish user plane resources, in connection with various aspects discussed herein.

Referring to FIG. 18, illustrated is a diagram of an example call flow 1800 using uplink data status to establish user plane resources, in connection with various aspects discussed herein. In call flow 1800, PDU sessions are active for both S-NSSAI_A and S-NSSAI_B, but only S-NSSAI_A has active user plane resources allocated (i.e., has a data radio bearer (DRB) active). At 1802, the UE can determine to initiate user plane resources for the PDU session active on S-NSSAI_B. The UE checks and determines that S-NSSAI_A and S-NSSAI_B cannot have user plane resources activated simultaneously. The UE can either wait until the user plane resources for S-NSSAI_A are released, or can initiate a service request that includes a PDU session status to implicitly release the SLICE_A PDU session (e.g., as in FIG. 17 or 19, etc.). Once the user plane resources for S-NSSAI_A are released, at 1804, the UE can send a service request or registration request comprising an uplink data status for S-NSSAI_B to the AMF. At 1806, in response to the uplink data status, user plane resources can be established for the PDU session active over S-NSSAI_B.

Figure 19:
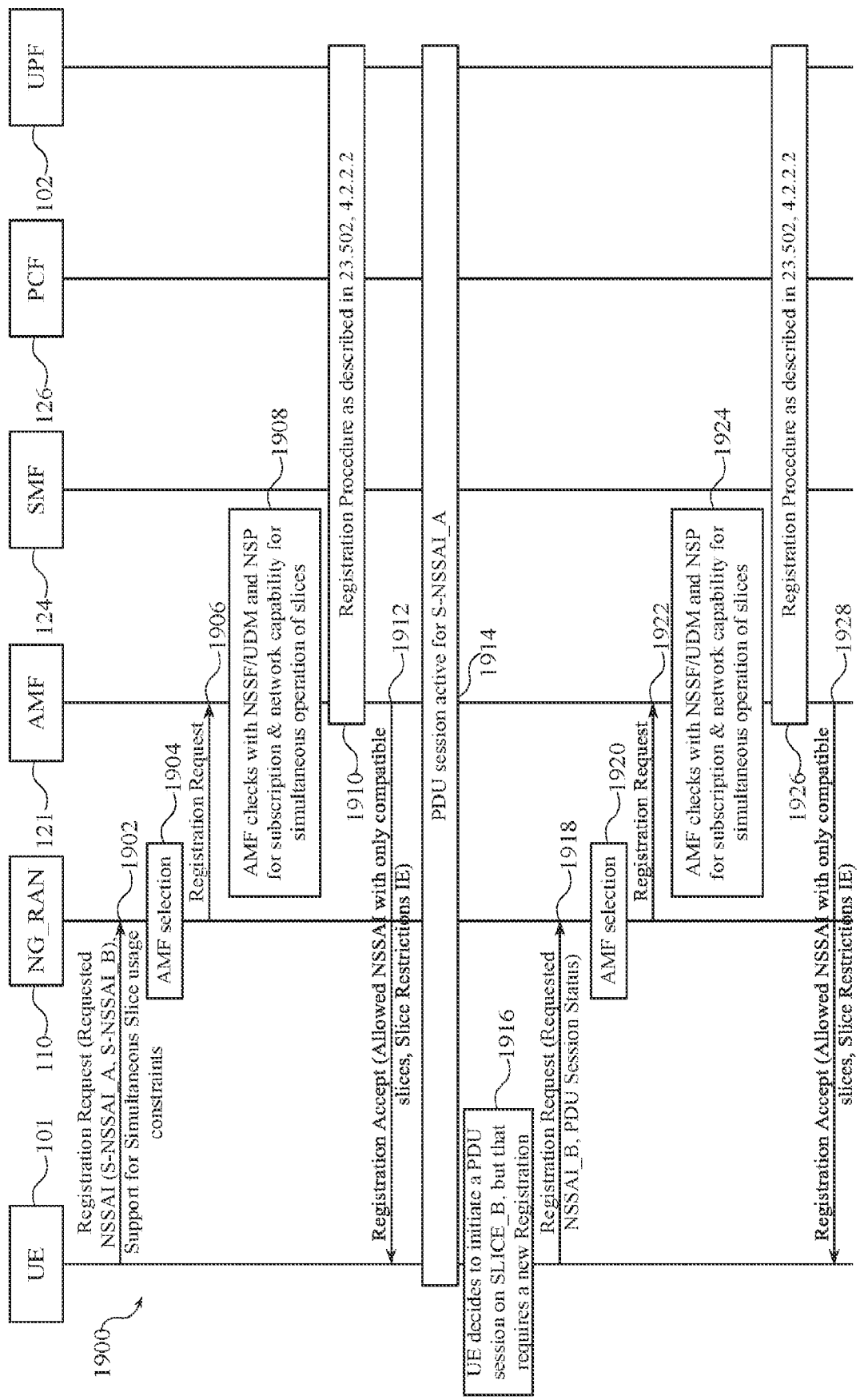
FIG. 19 illustrates a diagram of an example call flow using a PDU session status IE to locally release PDU session(s) when a UE is not allowed to register for constrained slices, in connection with various aspects discussed herein.

Referring to FIG. 19, illustrated is a diagram of an example call flow 1900 using a PDU session status IE to locally release PDU session(s) when a UE is not allowed to register for constrained slices, in connection with various aspects discussed herein. At 1902, the UE can transmit to a Next Generation (NG) Radio Access Network (RAN) (e.g., via a BS such as a gNB) a registration request message comprising requested NSSAI (e.g., S-NSSAI_A and S-NSSAI_B in the example of FIG. 19) and indicating support for simultaneous slice usage constraints. At 1904, the NG RAN can select an AMF based on the requested NSSAI in the RRC message, and at 1906, can send the registration request message to the selected AMF. At 1908, the AMF can check with the NSSF, UDM, and Network Service Provider (NSP) for subscription and network capability information related to simultaneous operation of the requested NSSAI. At 1910, in the scenario wherein S-NSSAI_A and S-NSSAI_B are incompatible, a registration procedure can be performed for S-NSSAI_A but not S-NSSAI_B. At 1912, the AMF can send the UE a registration accept message indicating allowed NSSAI comprising only compatible slices, along with a slice restrictions IE indicating slice incompatibility (and whether incompatible slices are served by the same AMF or different AMFs). At 1914, a PDU session can be active for S-NSSAI_A (but not the incompatible S-NSSAI_B. At 1916, the UE can decide to initiate a PDU session on SLICE_B, which requires a new registration due to incompatibility (e.g., for scenarios employing third option of the third set of aspects, etc.). At 1918, the UE can send the NG RAN a second registration request message, indicating requested NSSAI comprising S-NSSAI_B, along with a PDU session status IE, to trigger local release of incompatible PDU sessions. At 1920, the NG RAN can perform AMF selection based on the requested S-NSSAI_B, and at 1922 can forward the second registration request message to the appropriate AMF. At 1924, that AMF can check with NSSF, UDM, and NSP for subscription and network capability for simultaneous operation of slices based on the newly requested NSSAI (e.g., S-NSSAI_B). At 1926, a registration procedure can be performed for S-NSSAI_B, and at 1928, the AMF selected at 1920 can send a second registration accept message to the UE, indicating the new allowed NSSAI comprising only compatible slices, along with a new slice restrictions IE associated with the allowed NSSAI.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a User Equipment (UE) device comprising a processor configured to perform operations comprising: transmitting an initial registration request message that comprises an indication that the UE has a capability of support for simultaneous slice usage constraints; receiving a first registration accept message that indicates slice compatibility information for each configured network slice of a set of configured network slices for the UE, wherein the slice compatibility information for each configured network slice indicates whether or not other configured network slices of the set of configured network slices are compatible with the configured network slice for simultaneous operation by the UE; transmitting an additional registration request message to request registration on a set of requested network slices, wherein the set of requested network slices is a subset of the set of configured network slices; and receiving an additional registration accept message indicating the UE is registered to a set of allowed network slices, wherein the set of allowed network slices is a subset of the set of requested network slices.

Example 2 comprises the subject matter of any variation of any of example(s) 1, wherein the operations further comprise selecting the set of requested network slices based on the slice compatibility information for each configured network slice of the set of configured network slices, such that each requested network slice of the set of requested network slices is compatible with the other requested network slices of the set of requested network slices for simultaneous operation by the UE.

Example 3 comprises the subject matter of any variation of any of example(s) 1-2, wherein the set of allowed network slices comprises one or more of: a largest subset of the set of requested network slices that are each compatible with each other for simultaneous operation by the UE, or a first network slice of the set of requested network slices and any other requested network slices of the set of requested network slices that are compatible with the first network slice for simultaneous operation by the UE, wherein the first network slice is listed first among the set of requested network slices in the registration request message or the registration request message explicitly indicates priority information for the first network slice.

Example 4 comprises the subject matter of any variation of any of example(s) 1-3, wherein the set of allowed network slices comprises a first network slice and a second network slice, and wherein the slice compatibility information indicates that the first network slice and the second network slice are incompatible for simultaneous active PDU (Protocol Data Unit) sessions.

Example 5 comprises the subject matter of any variation of any of example(s) 4, wherein, when the UE has an active PDU session on the first network slice, the operations further comprise: transmitting a PDU session release request associated with the active PDU session on the first network slice; transmitting a PDU session establishment request associated with the second network slice; and receiving a PDU session establishment accept associated with the second network slice.

Example 6 comprises the subject matter of any variation of any of example(s) 4-5, wherein, when the UE has an active PDU session on the first network slice, the operations further comprise: transmitting a PDU session establishment request associated with the second network slice, wherein the PDU session establishment request comprises a priority indicator; receiving a PDU session release command associated with the first network slice; and receiving a PDU session establishment accept associated with the second network slice.

Example 7 comprises the subject matter of any variation of any of example(s) 4-6, wherein, when the UE has an active PDU session on the first network slice, the operations further comprise: transmitting one of a service request or a registration request comprising a PDU session status Information Element (IE) associated with the first network slice to trigger implicit release of the active PDU session on the first network slice; transmitting a PDU session establishment request associated with the second network slice; and receiving a PDU session establishment accept associated with the second network slice.

Example 8 comprises the subject matter of any variation of any of example(s) 4-7, wherein, when the UE has an active PDU session on the first network slice, the operations further comprising activating the second network slice via a non-Third Generation Partnership Project (3GPP) access technology.

Example 9 comprises the subject matter of any variation of any of example(s) 1-8, wherein the set of allowed network slices comprises a first network slice and a second network slice, and wherein, when the UE has an active PDU (Protocol Data Unit) session on the first network slice, the operations further comprise: transmitting a PDU session establishment request associated with the second network slice; receiving a PDU session establishment accept associated with the second network slice; and simultaneously maintaining the active PDU session on the first network slice and an active PDU session on the second network slice.

Example 10 comprises the subject matter of any variation of any of example(s) 9, wherein the operations further comprise: when the UE does not have active user plane resources on the first network slice, transmitting one of a service request or a registration request comprising an Uplink data status Information Element (IE) to trigger establishment of user plane resources associated with the active PDU session on the second network slice.

Example 11 is a User Equipment (UE) device comprising a processor configured to perform operations comprising: transmitting a registration request message to request registration on a set of requested network slices, wherein the set of requested network slices is a subset of a set of configured network slices for the UE; and receiving a registration accept message indicating the UE is registered to a set of allowed network slices, wherein the set of allowed network slices is a subset of the set of requested network slices, and wherein the registration accept message indicates slice compatibility information for each allowed network slice of the set of allowed network slices for the UE, wherein the slice compatibility information for each allowed network slice indicates whether or not other configured network slices of the set of configured network slices are compatible with the configured network slice for simultaneous operation by the UE.

Example 12 comprises the subject matter of any variation of any of example(s) 11, wherein the registration accept message indicates slice compatibility information for each configured network slice of the set of configured network slices for the UE, wherein the slice compatibility information for each configured network slice indicates whether or not other configured network slices of the set of configured network slices are compatible with the configured network slice for simultaneous operation by the UE.

Example 13 comprises the subject matter of any variation of any of example(s) 11-12, wherein, when the slice compatibility information for each allowed network slice of the set of allowed network slices indicates another allowed network slice of the set of allowed network slices are incompatible with the allowed network slice for simultaneous operation by the UE, it further indicates whether the allowed network slice and the other allowed network slice are associated with the same Access and Mobility Management Function (AMF) or different AMFs.

Example 14 comprises the subject matter of any variation of any of example(s) 11-13, wherein the set of requested network slices comprises a first network slice and a second network slice, wherein the first network slice and the second network slice are incompatible with each other for simultaneous operation by the UE, and wherein the set of allowed network slices comprises the first network slice but not the second network slice.

Example 15 comprises the subject matter of any variation of any of example(s) 14, wherein the registration accept message indicates a timer, wherein the UE can request registration to the second network slice after expiration of the timer.

Example 16 comprises the subject matter of any variation of any of example(s) 14-15, wherein, when the UE has an active PDU session on the first network slice, the operations further comprise: transmitting a second registration request message to request registration on the second network slice and implicitly release the active PDU session on the first network slice; and receiving a second registration accept message indicating the UE is registered to the second network slice.

Example 17 comprises the subject matter of any variation of any of example(s) 11-16, wherein the set of allowed network slices comprises a first network slice and a second network slice, and wherein the slice compatibility information indicates that the first network slice and the second network slice are incompatible for simultaneous active PDU (Protocol Data Unit) sessions.

Example 18 comprises the subject matter of any variation of any of example(s) 17, wherein, when the UE has an active PDU session on the first network slice, the operations further comprise: transmitting a PDU session release request associated with the active PDU session on the first network slice; transmitting a PDU session establishment request associated with the second network slice; and receiving a PDU session establishment accept associated with the second network slice.

Example 19 comprises the subject matter of any variation of any of example(s) 17-18, wherein, when the UE has an active PDU session on the first network slice, the operations further comprise: transmitting a PDU session establishment request associated with the second network slice, wherein the PDU session establishment request comprises a priority indicator; receiving a PDU session release command associated with the first network slice; and receiving a PDU session establishment accept associated with the second network slice.

Example 20 comprises the subject matter of any variation of any of example(s) 17-19, wherein, when the UE has an active PDU session on the first network slice, the operations further comprise: transmitting one of a service request or a registration request comprising a PDU session status Information Element (IE) associated with the first network slice to trigger implicit release of the active PDU session on the first network slice; transmitting a PDU session establishment request associated with the second network slice; and receiving a PDU session establishment accept associated with the second network slice.

Example 21 comprises the subject matter of any variation of any of example(s) 17-20, wherein, when the UE has an active PDU session on the first network slice, the operations further comprising activating the second network slice via a non-Third Generation Partnership Project (3GPP) access technology.

Example 22 comprises the subject matter of any variation of any of example(s) 11-20, wherein the set of allowed network slices comprises a first network slice and a second network slice, and wherein, when the UE has an active PDU session on the first network slice, the operations further comprise: transmitting a PDU session establishment request associated with the second network slice; receiving a PDU session establishment accept associated with the second network slice; and simultaneously maintaining the active PDU session on the first network slice and an active PDU session on the second network slice.

Example 23 comprises the subject matter of any variation of any of example(s) 22, wherein the operations further comprise: when the UE does not have active user plane resources on the first network slice, transmitting one of a service request or a registration request comprising an Uplink data status Information Element (IE) to trigger establishment of user plane resources associated with the active PDU session on the second network slice.

Example 24 is an Access and Mobility Management Function (AMF) comprising a processor configured to perform operations comprising: receiving an initial registration request message that comprises an indication that a User Equipment (UE) has a capability of support for simultaneous slice usage constraints; generating a first registration accept message for transmission that indicates slice compatibility information for each configured network slice of a set of configured network slices for the UE, wherein the slice compatibility information for each configured network slice indicates whether or not other configured network slices of the set of configured network slices are compatible with the configured network slice for simultaneous operation by the UE; receiving an additional registration request message to request registration on a set of requested network slices, wherein the set of requested network slices is a subset of the set of configured network slices; registering the UE to the set of allowed network slices, wherein the set of allowed network slices is a subset of the set of requested network slices; and generating an additional registration accept message for transmission indicating the UE is registered to the set of allowed network slices.

Example 25 comprises the subject matter of any variation of any of example(s) 24, wherein each requested network slice of the set of requested network slices is compatible with the other requested network slices of the set of requested network slices for simultaneous operation by the UE.

Example 26 comprises the subject matter of any variation of any of example(s) 24-25, wherein the set of allowed network slices comprises one or more of: a largest subset of the set of requested network slices that are each compatible with each other for simultaneous operation by the UE, or a first network slice of the set of requested network slices and any other requested network slices of the set of requested network slices that are compatible with the first network slice for simultaneous operation by the UE, wherein the first network slice is indicated first in the registration request message.

Example 27 comprises the subject matter of any variation of any of example(s) 24-26, wherein the operations further comprise: receiving subscription information for the UE associated with the set of requested network slices from a Unified Data Management (UDM); receiving network capability information for simultaneous operation of the set of requested network slices from a Network Slice Selection Function (NSSF); and selecting the set of allowed network slices based at least in part on the subscription information and the network capability information.

Example 28 comprises the subject matter of any variation of any of example(s) 24-27, wherein the set of allowed network slices comprises a first network slice and a second network slice, and wherein the slice compatibility information indicates that the first network slice and the second network slice are incompatible for simultaneous active PDU (Protocol Data Unit) sessions.

Example 29 comprises the subject matter of any variation of any of example(s) 28, wherein, when the UE has an active PDU session on the first network slice, the operations further comprise: receiving a PDU session release request associated with the active PDU session on the first network slice; releasing the active PDU session on the first network slice in response to the PDU session release request; receiving a PDU session establishment request associated with the second network slice; establishing an active PDU session for the UE on the second network slice; and generating a PDU session establishment accept associated with the second network slice for transmission.

Example 30 comprises the subject matter of any variation of any of example(s) 28-29, wherein, when the UE has an active PDU session on the first network slice, the operations further comprise: receiving a PDU session establishment request associated with the second network slice, wherein the PDU session establishment request comprises a priority indicator; releasing the active PDU session on the first network slice in response to the PDU session establishment request; generating a PDU session release command associated with the first network slice for transmission; establishing an active PDU session for the UE on the second network slice; and generating a PDU session establishment accept associated with the second network slice for transmission.

Example 31 comprises the subject matter of any variation of any of example(s) 28-30, wherein, when the UE has an active PDU session on the first network slice, the operations further comprise: receiving one of a service request or a registration request comprising a PDU session status Information Element (IE) associated with the second network slice; release the active PDU session on the first network slice in response to the one of the service request or the registration request; receiving a PDU session establishment request associated with the second network slice; establishing an active PDU session for the UE on the second network slice; and generating a PDU session establishment accept associated with the second network slice for transmission.

Example 32 comprises the subject matter of any variation of any of example(s) 28-31, wherein the NAS signaling comprises a Slice Compatibility Information Element (IE) that indicates, for each other network slice of the plurality of network slices, whether or not the network slice is compatible with the other network slice for simultaneous operation by a User Equipment (UE), and wherein the operations further comprise: receiving, from a Unified Data Management (UDM), subscription information for the UE indicating that the UE is no longer subscribed to the second network slice; and generating a Configuration Update Command indicating removal of the second network slice from the Slice Compatibility IE.

Example 33 comprises the subject matter of any variation of any of example(s) 24-32, wherein the at least one of the one or more network slices comprises a first network slice and a second network slice, and wherein, when the UE has an active PDU session on the first network slice, the operations further comprise: receiving a PDU session establishment request associated with the second network slice; determining that the first network slice and the second network slice can operate simultaneously in connection with the UE; establishing an active PDU session for the UE on the second network slice; and generating a PDU session establishment accept associated with the second network slice for transmission.

Example 34 comprises the subject matter of any variation of any of example(s) 33, wherein the operations further comprise: receiving one of a service request or a registration request comprising an uplink data status Information Element (IE) associated with the second network slice; and establish user plane resources associated with the active PDU session on the second network slice.

Example 35 is an Access and Mobility Management Function (AMF) comprising a processor configured to perform operations comprising: receiving a registration request message to request registration on a set of requested network slices, wherein the set of requested network slices is a subset of a set of configured network slices for the UE; registering the UE to a set of allowed network slices, wherein the set of allowed network slices is a subset of the set of requested network slices; and generating a registration accept message for transmission indicating the UE is registered to the set of allowed network slices, wherein the registration accept message indicates slice compatibility information for each allowed network slice of the set of allowed network slices for the UE, wherein the slice compatibility information for each allowed network slice indicates whether or not other configured network slices of the set of configured network slices are compatible with the configured network slice for simultaneous operation by the UE.

Example 36 comprises the subject matter of any variation of any of example(s) 35, wherein the registration accept message indicates slice compatibility information for each configured network slice of the set of configured network slices for the UE, wherein the slice compatibility information for each configured network slice indicates whether or not other configured network slices of the set of configured network slices are compatible with the configured network slice for simultaneous operation by the UE.

Example 37 comprises the subject matter of any variation of any of example(s) 35-36, wherein, when the slice compatibility information for each allowed network slice of the set of allowed network slices indicates another allowed network slice of the set of allowed network slices are incompatible with the allowed network slice for simultaneous operation by the UE, it further indicates whether the allowed network slice and the other allowed network slice are associated with the same Access and Mobility Management Function (AMF) or different AMFs.

Example 38 comprises the subject matter of any variation of any of example(s) 35-37, wherein the set of requested network slices comprises a first network slice and a second network slice, wherein the first network slice and the second network slice are incompatible with each other for simultaneous operation by the UE, and wherein the set of allowed network slices comprises the first network slice but not the second network slice.

Example 39 comprises the subject matter of any variation of any of example(s) 38, wherein the registration accept message indicates a timer, wherein the UE can request registration to the second network slice after expiration of the timer.

Example 40 comprises the subject matter of any variation of any of example(s) 38-39, wherein, when the UE has an active PDU session on the first network slice, the operations further comprise: receiving a second registration request message to request registration of the UE on the second network slice, wherein the second registration request message comprises a PDU Session status IE indicating the PDU session associated with first network slice is inactive; releasing the PDU session on the first network slice in response to the second registration request message; registering the UE to the second network slice; and generating a second registration accept message indicating the UE is registered to the second network slice.

Example 41 comprises the subject matter of any variation of any of example(s) 35-40, wherein the set of allowed network slices comprises a first network slice and a second network slice, and wherein the slice compatibility information indicates that the first network slice and the second network slice are incompatible for simultaneous active PDU (Protocol Data Unit) sessions.

Example 42 comprises the subject matter of any variation of any of example(s) 41, wherein, when the UE has an active PDU session on the first network slice, the operations further comprise: receiving a PDU session release request associated with the active PDU session on the first network slice; releasing the active PDU session on the first network slice in response to the PDU session release request; receiving a PDU session establishment request associated with the second network slice; establishing an active PDU session for the UE on the second network slice; and generating a PDU session establishment accept associated with the second network slice for transmission.

Example 43 comprises the subject matter of any variation of any of example(s) 41-42, wherein, when the UE has an active PDU session on the first network slice, the operations further comprise: receiving a PDU session establishment request associated with the second network slice, wherein the PDU session establishment request comprises a priority indicator; releasing the active PDU session on the first network slice in response to the PDU session establishment request; generating a PDU session release command associated with the first network slice for transmission; establishing an active PDU session for the UE on the second network slice; and generating a PDU session establishment accept associated with the second network slice for transmission.

Example 44 comprises the subject matter of any variation of any of example(s) 41-43, wherein, when the UE has an active PDU session on the first network slice, the operations further comprise: receiving one of a service request or a registration request comprising a PDU session status Information Element (IE) associated with the second network slice; release the active PDU session on the first network slice in response to the one of the service request or the registration request; receiving a PDU session establishment request associated with the second network slice; establishing an active PDU session for the UE on the second network slice; and generating a PDU session establishment accept associated with the second network slice for transmission.

Example 45 comprises the subject matter of any variation of any of example(s) 41-44, wherein the NAS signaling comprises a Slice Compatibility Information Element (IE) that indicates, for each other network slice of the plurality of network slices, whether or not the network slice is compatible with the other network slice for simultaneous operation by a User Equipment (UE), and wherein the operations further comprise: receiving, from a Unified Data Management (UDM), subscription information for the UE indicating that the UE is no longer subscribed to the second network slice; and generating a Configuration Update Command indicating removal of the second network slice from the Slice Compatibility IE.

Example 46 comprises the subject matter of any variation of any of example(s) 35-45, wherein the at least one of the one or more network slices comprises a first network slice and a second network slice, and wherein, when the UE has an active PDU session on the first network slice, the operations further comprise: receiving a PDU session establishment request associated with the second network slice; determining that the first network slice and the second network slice can operate simultaneously in connection with the UE; establishing an active PDU session for the UE on the second network slice; and generating a PDU session establishment accept associated with the second network slice for transmission.

Example 47 comprises the subject matter of any variation of any of example(s) 46, wherein the operations further comprise: receiving one of a service request or a registration request comprising an uplink data status Information Element (IE) associated with the second network slice; and establish user plane resources associated with the active PDU session on the second network slice.

Example 48 comprises an apparatus comprising means for executing any of the described operations of examples 1-47.

Example 49 comprises a machine readable medium that stores instructions for execution by a processor to perform any of the described operations of examples 1-47.

Example 50 comprises an apparatus comprising: a memory interface; and processing circuitry configured to: perform any of the described operations of examples 1-47.

Example 51 comprises a User Equipment (UE) configured to execute any of the described operations of examples 1-23.

Example 52 comprises an Access and Mobility Management Function (AMF) configured to execute any of the described operations of examples 24-47.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A system comprising a User Equipment (UE), and an Access and Mobility Management Function (AMF) comprising
a processor configured to:
receive, from the UE, an initial registration request message that comprises an indication that the UE has a capability of support for simultaneous slice usage constraints;
generate a first registration accept message, for transmission to the UE, that indicates slice compatibility information for each configured network slice of a set of configured network slices for the UE, wherein the slice compatibility information for each configured network slice indicates whether or not other configured network slices of the set of configured network slices are compatible with the configured network slice for simultaneous registration;
receive, from the UE, an additional registration request message to request registration on a set of requested network slices, wherein the set of requested network slices is a subset of the set of configured network slices, and wherein the set of requested network slices is compatible for simultaneous registration according to the slice compatibility information;
register the UE to the set of requested network slices; and
generate an additional registration accept message for transmission to the UE indicating the UE is registered to the set of requested network slices;
wherein the UE comprises a processor configured to generate the additional registration request message based on the slice compatibility information, such that the set of requested network slices is compatible for simultaneous registration according to the slice compatibility information;
wherein the additional registration request message only requests registration on network slices that are compatible for simultaneous registration according to the slice compatibility information.

2. The system of claim 1, wherein each requested network slice of the set of requested network slices is compatible with other requested network slices of the set of requested network slices for simultaneous operation by the UE.

3. The system of claim 1, wherein the processor of the AMF is further configured to:
receive subscription information for the UE associated with the set of requested network slices from a Unified Data Management (UDM);
receive network capability information for simultaneous operation of the set of requested network slices from a Network Slice Selection Function (NSSF); and
register the UE to the set of requested network slices based at least in part on the subscription information and the network capability information.

4. The system of claim 1, wherein the set of requested network slices comprises a first network slice and a second network slice, and wherein the slice compatibility information indicates that the first network slice and the second network slice are incompatible for simultaneous active PDU (Protocol Data Unit) sessions.

5. The system of claim 4, wherein, when the UE has an active PDU session on the first network slice, the processor of the AMF is further configured to:
receive, from the UE, a PDU session release request associated with the active PDU session on the first network slice;
release the active PDU session on the first network slice in response to the PDU session release request;
receive, from the UE, a PDU session establishment request associated with the second network slice;
establish an active PDU session for the UE on the second network slice; and
generate, for transmission to the UE, a PDU session establishment accept associated with the second network slice.

6. The AMF of claim 4, wherein, when the UE has an active PDU session on the first network slice, the processor of the AMF is further configured to:
receive, from the UE, a PDU session establishment request associated with the second network slice, wherein the PDU session establishment request comprises a priority indicator;
release the active PDU session on the first network slice in response to the PDU session establishment request;
generate, for transmission to the UE, a PDU session release command associated with the first network slice;
establish an active PDU session for the UE on the second network slice; and
generate, for transmission to the UE, a PDU session establishment accept associated with the second network slice.

7. The system of claim 1, wherein the set of requested network slices comprises a first network slice and a second network slice, and wherein, when the UE has an active Protocol Data Unit PDU (session) on the first network slice, the processor of the AMF is further configured to:
receive, from the UE, a PDU session establishment request associated with the second network slice;
determine that the first network slice and the second network slice are compatible to operate simultaneously in connection with the UE;
establish an active PDU session for the UE on the second network slice; and
generate, for transmission to the UE, a PDU session establishment accept associated with the second network slice.

8. The system of claim 7, wherein the processor of the AMF is further configured to:
receive, from the UE, one of: a service request or a registration request, comprising an uplink data status Information Element (IE) associated with the second network slice; and
establish user plane resources associated with the active PDU session on the second network slice.

9. A method comprising:
receiving, at an Access and Mobility Management Function (AMF), an initial registration request message that comprises an indication that a User Equipment (UE) has a capability of support for simultaneous slice usage constraints;
transmitting, by the AMF to the UE, a first registration accept message indicating slice compatibility information for each configured network slice of a set of configured network slices for the UE, wherein the slice compatibility information for each configured network slice indicates whether or not other configured network slices of the set of configured network slices are compatible with the configured network slice for simultaneous registration;

transmitting, by the UE to the AMF, an additional registration request message based on the slice compatibility information, to request registration on a set of requested network slices, wherein the set of requested network slices is a subset of the set of configured network slices, and wherein the set of requested network slices is compatible for simultaneous registration according to the slice compatibility information;

registering, by the AMF, the UE to the set of requested network slices; and transmitting, by the AMF to the UE, an additional registration accept message indicating the UE is registered to the set of requested network slices;

wherein the additional registration request message only requests registration on network slices that are compatible for simultaneous registration according to the slice compatibility information.

* * * * *